(12) United States Patent
Nose

(10) Patent No.: US 9,716,274 B2
(45) Date of Patent: Jul. 25, 2017

(54) CATHODE ACTIVE MATERIAL FOR SODIUM BATTERIES, AND SODIUM BATTERY

(71) Applicant: TOYOTA JIDOSHA KABUSHIKI KAISHA, Toyota-shi, Aichi-ken (JP)

(72) Inventor: Masafumi Nose, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/030,091

(22) PCT Filed: Aug. 25, 2014

(86) PCT No.: PCT/JP2014/072172
§ 371 (c)(1),
(2) Date: Apr. 18, 2016

(87) PCT Pub. No.: WO2015/059998
PCT Pub. Date: Apr. 30, 2015

(65) Prior Publication Data
US 2016/0315321 A1    Oct. 27, 2016

(30) Foreign Application Priority Data

Oct. 24, 2013 (JP) ................. 2013-221302

(51) Int. Cl.
*H01B 1/06* (2006.01)
*H01M 4/58* (2010.01)
(Continued)

(52) U.S. Cl.
CPC ........... *H01M 4/5825* (2013.01); *C01B 25/40* (2013.01); *C01B 25/42* (2013.01); *C01B 25/45* (2013.01);
(Continued)

(58) Field of Classification Search
CPC .. H01B 1/00; H01B 1/06; H01M 5/58; H01M 10/054; C01B 25/40
See application file for complete search history.

(56) References Cited

U.S. PATENT DOCUMENTS 9,455,445 B2 * 9/2016 Koga ................. H01M 4/5825
9,537,146 B2 * 1/2017 Nose ....................... C01B 25/45
(Continued)

FOREIGN PATENT DOCUMENTS

WO    2013/031331 A1    3/2013
WO    2013/045905 A1    4/2013

OTHER PUBLICATIONS

Sanz et al "Synthesis, structural characterization, magnetic properties, and ionic conductivity of Na4M3(PO4)2(P2O7) (M= Mn, Co, Ni)", Chem. Mater. 2001, 13, 1334-1340.*
(Continued)

*Primary Examiner* — Mark Kopec
(74) *Attorney, Agent, or Firm* — Oliff PLC

(57) ABSTRACT

A cathode active material for sodium batteries has excellent discharge capacity, and a sodium battery has the cathode active material for sodium batteries. A cathode active material for sodium batteries is represented by a general formula $Na_4Co_{(3-x)}M_x(PO_4)_2P_2O_7$; M is any of Fe, Cr, Mn and Al; X is $0.015 \leq x \leq 0.21$ when M is Fe; X is $0.03 \leq x \leq 0.18$ when M is Cr; X is $0.006 \leq x \leq 0.24$ when M is Mn; and X is $0.03 \leq x \leq 0.06$ when M is Al.

7 Claims, 14 Drawing Sheets

(51) Int. Cl.
*C01B 25/40* (2006.01)
*H01M 10/054* (2010.01)
*C01B 25/45* (2006.01)
*C01B 25/42* (2006.01)
*H01M 4/02* (2006.01)

(52) U.S. Cl.
CPC ............ H01B 1/06 (2013.01); H01M 10/054 (2013.01); *H01M 2004/028* (2013.01)

(56) References Cited

U.S. PATENT DOCUMENTS

2014/0197358 A1* 7/2014 Nose .................. C01B 25/45
 252/182.1
2015/0280215 A1* 10/2015 Nose .................. H01M 4/5825
 429/220

OTHER PUBLICATIONS

Sanz et al "Na4Co3(PO4)2P2O7, a new sodium cobalt phosphate . . . ", Journal of Solid State Chem. 123, 129-139 (1996).*

* cited by examiner

CATHODE ACTIVE MATERIAL FOR SODIUM BATTERIES, AND SODIUM BATTERY

TECHNICAL FIELD

The present invention relates to a cathode active material for sodium batteries, and a sodium battery.

BACKGROUND ART

In recent years, with the rapid spread of information-related devices, communication devices and so on, great emphasis has been placed on the development of batteries for use as the power source of such devices. Also, in the automobile industry, the development of high-output and high-power batteries for electric vehicles and hybrid vehicles, has been promoted. Of various kinds of batteries, a lithium battery has attracted attention, due to its high energy density and high power output.

In lithium batteries, generally, a lithium metal complex oxide which has a layered structure, such as lithium nickelate or lithium cobaltate, is used as the cathode active material, and a carbonaceous material which is able to occlude/release lithium ions, a lithium metal, a lithium alloy or the like is used as the anode active material. As the electrolyte disposed between the cathode and the anode, a liquid electrolyte in which lithium salt is dissolved, a solid electrolyte which contains lithium, etc., is used.

As described above, while lithium batteries have excellent energy density and power output, rising lithium prices due to a growing demand for lithium batteries, limited lithium reserves, etc., are a bottleneck in mass production and upsizing.

Accordingly, studies on sodium batteries have been promoted, in which sodium, which is an abundant resource and low-cost, is used in place of lithium (e.g., Patent Literatures 1 and 2).

For example, a cathode active material for sodium batteries is disclosed in Patent Literature 1, which is represented by a general formula $Na_xM_y(AO_4)_zP_2O_7$ in which M is any of Ni, Mn and Co, and a part thereof can be substituted with at least one selected from the group consisting of Ti, V, Cr, Mn, Fe, Co, Ni, Cu and Zn. Also in Patent Literature 1, the synthesis and evaluation of a cathode active material are described, which is represented by the above general formula in which M is Co and a part thereof is substituted with at least one of Mn and Ni.

CITATION LIST

Patent Literature 1: International Publication No. WO2013/031331
Patent Literature 2: International Publication No. WO2013/045905

SUMMARY OF INVENTION

Technical Problem

However, Patent Literature 1 is directed to the problem of low operating potential of a cathode active material for sodium batteries, and the object of Patent Literature 1 is to provide a cathode active material for sodium batteries which has high operating potential. In Patent Literature 1, discharge capacity is not fully considered. The inventor of the present invention has found that cathode active materials which were actually synthesized and evaluated under "Example" in Patent Literature 1 and in which Co was contained as M, have a problem of low discharge capacity.

The present invention was achieved in light of the above circumstance. An object of the present invention is to provide a cathode active material for sodium batteries which has excellent discharge capacity, and a sodium battery comprising the cathode active material.

Solution to Problem

The cathode active material for sodium batteries according to the present invention is represented by a general formula $Na_4Co_{(3-x)}M_x(PO_4)_2P_2O_7$; is any of Fe, Cr, Mn and Al; X is $0.015 \leq x \leq 0.21$ when M is Fe; X is $0.03 \leq x \leq 0.18$ when M is Cr; X is $0.006 \leq x \leq 0.24$ when M is Mn; and X is $0.03 \leq x \leq 0.06$ when M is Al.

According to the present invention, the cathode active material for sodium batteries, which has excellent discharge capacity, can be provided by substituting a part of Co in the compounds represented by the above general formula with the specific metal M, which can be trivalent, and controlling the substitution amount x within an appropriate range.

The cathode active material for sodium batteries according to the present invention preferably has a crystal structure belonging to space group $Pn2_1a$. The reason is as follows: in the case of having the crystal structure belonging to the space group $Pn2_1a$, all Na ions in the crystal structure are aligned in any of the a-axis, b-axis and c-axis directions, and this is very favorable for conduction of the Na ions.

The sodium battery according to the present invention comprises a cathode containing the cathode active material for sodium batteries according to the present invention.

Advantageous Effects of Invention

According to the present invention, a cathode active material for sodium batteries which has high discharge capacity can be provided. Therefore, the energy density of sodium batteries can be increased by using the cathode active material for sodium batteries according to the present invention.

DESCRIPTION OF EMBODIMENTS

Hereinafter, the cathode active material for sodium batteries (hereinafter, it may be simply referred to as "cathode active material") and the sodium battery according to the present invention will be described in detail.

[Cathode Active Material for Sodium Batteries]

The cathode active material for sodium batteries according to the present invention is represented by a general formula $Na_4Co_{(3-x)}M_x(PO_4)_2P_2O_7$; M is any of Fe, Cr, Mn and Al; X is $0.015 \leq x \leq 0.21$ when M is Fe; X is $0.03 \leq x \leq 0.18$ when M is Cr; X is $0.006 \leq x \leq 0.24$ when M is Mn; and X is $0.03 \leq x \leq 0.06$ when M is Al.

The present invention encompasses the following first to fourth cathode active materials.

The first cathode active material for sodium batteries is represented by a general formula $Na_4Co_{(3-x)}Fe_x(PO_4)_2P_2O_7$ ($0.015 \leq x \leq 0.21$).

The second cathode active material for sodium batteries is represented by a general formula $Na_4Co_{(3-x)}Cr_x(PO_4)_2P_2O_7$ ($0.03 \leq x \leq 0.18$).

The third cathode active material for sodium batteries is represented by a general formula $Na_4Co_{(3-x)}Mn_x(PO_4)_2P_2O_7$ ($0.006 \leq x \leq 0.24$).

The fourth cathode active material for sodium batteries is represented by a general formula $Na_4Co_{(3-x)}Al_x(PO_4)_2P_2O_7$ ($0.03 \leq x \leq 0.06$).

As a result of diligent research, the inventor of the present invention has found that the compound represented by $Na_4Co_3(PO_4)_2P_2O_7$ is usable as the cathode active material of a sodium battery, and it works in a high potential range. However, as a result of further research, the inventor of the present invention has found that $Na_4Co_3(PO_4)_2P_2O_7$ which was actually synthesized and evaluated in Patent Literature 1 and $Na_4Co_3(PO_4)_2P_2O_7$ which was actually synthesized and evaluated in Patent Literature 1 and in which a part of Co was substituted with at least one of Mn and Ni, have a problem of low discharge capacity.

In particular, according to the result of Example 3 in Patent Literature 1 (paragraph 0092 and FIG. 11), the discharge capacity of $Na_4Co_3(PO_4)_2P_2O_7$ is about 90 mAh/g. It is also shown by the results of comparative examples which will be described below, that the discharge capacity of $Na_4Co_3(PO_4)_2P_2O_7$ is not more than 100 mAh/g when the substitution amount x is 0 (x=0).

Figure 13:
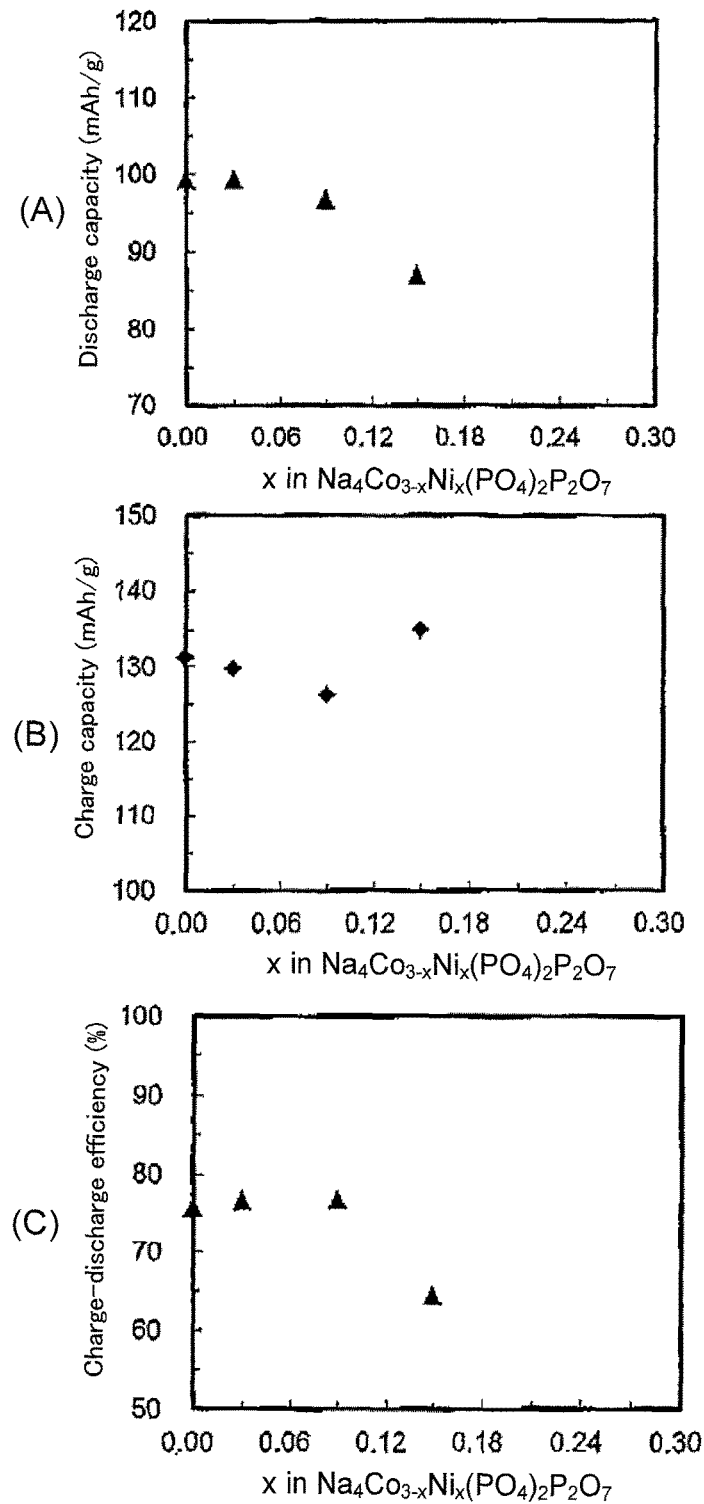
FIG. 13 shows a graph of discharge capacities of secondary batteries containing cathode active materials of Comparative Examples 1 and 18 to 20.
Figure 14:
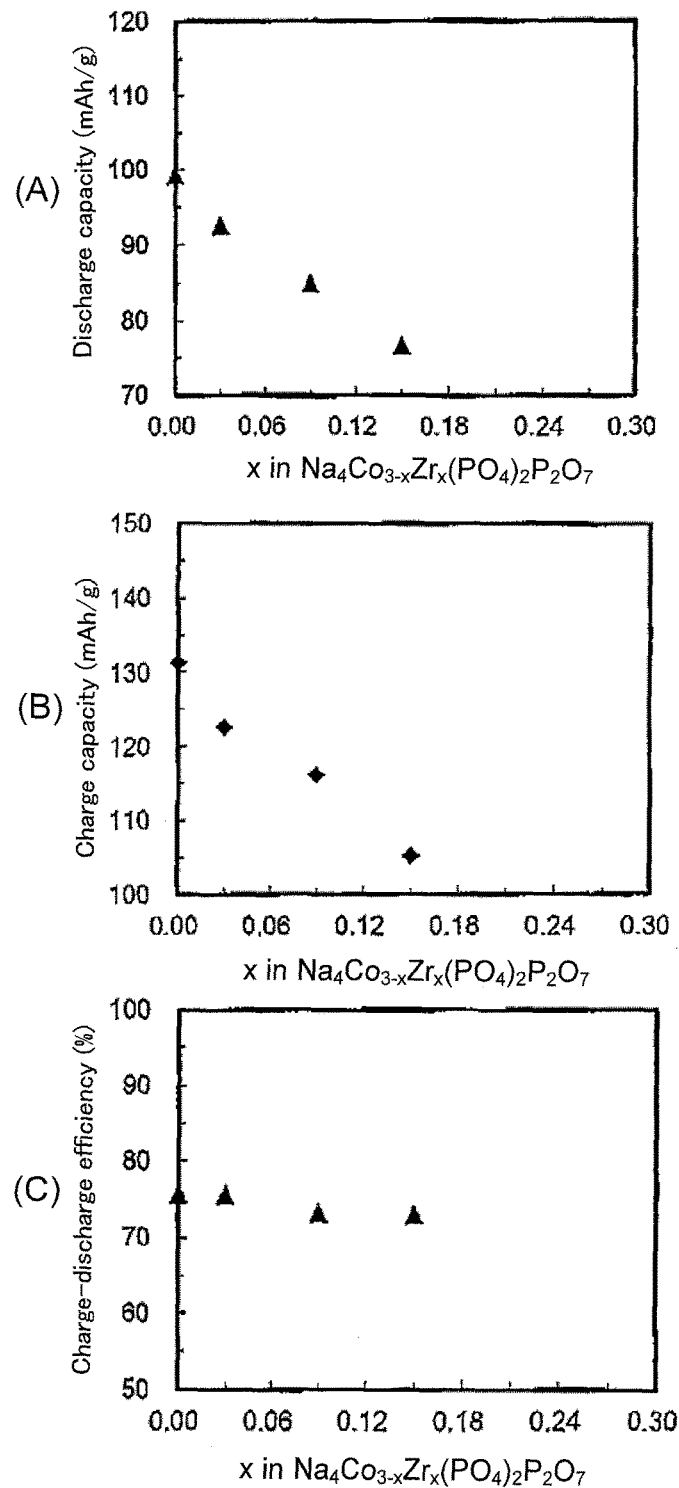
FIG. 14 shows a graph of discharge capacities of secondary batteries containing cathode active materials of Comparative Examples 1 and 21 to 23.

According to the results of Examples 4 to 8 in Patent Literature 1, the discharge capacity of $Na_4Co_3(PO_4)_2P_2O_7$ in which a part of Co is substituted with Mn, is 90 to 103 mAh/g when the substitution amount x of Mn is in a range of 0.3 to 0.9 (paragraph 0101 and FIGS. 13 and 14). It is also shown by the results of the comparative examples which will be described below, that the discharge capacity of $Na_4Co_3(PO_4)_2P_2O_7$ in which a part of Co is substituted with Mn, is about 100 mAh/g when the substitution amount x of Mn is 0.3, that is, in the case of the substitution amount disclosed in Patent Literature 1.

According to the results of Examples 9 to 12 in Patent Literature 1, the discharge capacity of. $Na_4Co_3(PO_4)_2P_2O_7$ in which a part of Co is substituted with Mn and Ni, is 90 to 95 mAh/g when the total substitution amount X of Mn and Ni is in a range of 0.6 to 2.0 (paragraph 0111 and FIG. 16). In the case of being substituted with Ni only, the below-described comparative examples show that the discharge capacity of $Na_4Co_3(PO_4)_2P_2O_7$ in which a part of Co is substituted with Ni is not more than 100 mAh/g when the substitution amount x of Ni is 0.03 to 0.15.

A reason for the low discharge capacities of the above-described cathode active materials such as $Na_4Co_3(PO_4)_2P_2O_7$ is that irreversible capacity is caused since a part of $Na^+$ desorbed upon charging are not inserted upon discharging. The reason why a part of $Na^+$ desorbed upon charging do not return upon discharging, is estimated to be that the diffusivity of $Na^+$ inside the cathode active material is low at the end of discharging.

As a result of research to increase discharge capacity (reversible capacity), the inventors of the present invention has found that discharge capacity can be increased by substituting a part of Co in $Na_4Co_3(PO_4)_2P_2O_7$ with the specific metal element M, which can be trivalent, at a specific ratio (the amount of Co/the amount of metal M=(3-x)/x). More specifically, the inventor has found that a cathode active material for sodium batteries which has larger discharge capacity than $Na_4Co_3(PO_4)_2P_2O_7$ can be obtained by: substituting a part of Co with Fe at a ratio of $0.015 \leq x \leq 0.21$; substituting a part of Co with Cr at a ratio of $0.03 \leq x \leq 0.18$; substituting a part of Co with Mn at a ratio of $0.006 \leq x \leq 0.24$; or substituting a part of Co with Al at a ratio of $0.03 \leq x \leq 0.06$. According to the present invention, a large discharge capacity which is much larger than 100 mAh/g can be realized.

The increase in the discharge capacity of the cathode active material largely contributes to an increase in charge-discharge efficiency. It also increases battery operating time per charge, such as an increase in electric vehicle's distance to empty.

The cathode active material for sodium batteries according to the present invention exerts a common effect of achieving higher discharge capacity than $Na_4Co_3(PO_4)_2P_2O_7$, by a common means of substituting a part of Co in $Na_4Co_3(PO_4)_2P_2O_7$ with the specific metal (specific metal ion) which can be trivalent, and controlling the substitution amount x within the appropriate range.

The reason why the discharge capacity of the cathode active material for sodium batteries according to the present invention is increased higher than $Na_4Co_3(PO_4)_2P_2O_7$, is not clear at this time. However, as a factor, it is considered that by substituting a part (specific amount) of Co with the metal which can be trivalent, such as Fe, Cr, Mn or Al, the reversibility of the crystal structure of the cathode active material is increased upon discharging, and the diffusivity of $Na^+$ inside the cathode active material is increased at the end of discharging.

It has been confirmed by the inventor of the present invention, that even if a part of Co in $Na_4Co_3(PO_4)_2P_2O_7$ is substituted with a divalent stable metal (metal ion) such as Mg or Ca, discharge capacity cannot be increased; moreover, even if a part of Co in $Na_4CO_3(PO_4)_2P_2O_7$ is substituted with a metal which can be trivalent, discharge capacity cannot be increased in the case where the metal is a metal other than the above-specified metal, such as Cu, Zn, Ni or Zr (see the below-described comparative examples).

Hereinafter, the configurations of the first to fourth cathode active materials for sodium batteries according to the present invention, will be described.

(The First Cathode Active Material for Sodium Batteries)

The first cathode active material for sodium batteries is represented by the general formula $Na_4Co_{(3-x)}Fe_x(PO_4)_2P_2O_7$ ($0.015 \leq x \leq 0.21$).

In the first cathode active material for sodium batteries, x (the substitution amount of Co with Fe) is required to be within a range of $0.015 \leq x \leq 0.21$. From the point of view that higher discharge capacity and high charge-discharge efficiency can be obtained, preferred is $0.03 \leq x$. From the same point of view, more preferred is $x \leq 0.09$, and particularly preferred is $x \leq 0.06$.

The first cathode active material for sodium batteries preferably has a crystal structure belonging to space group $Pn2_1a$.

Figure 1:
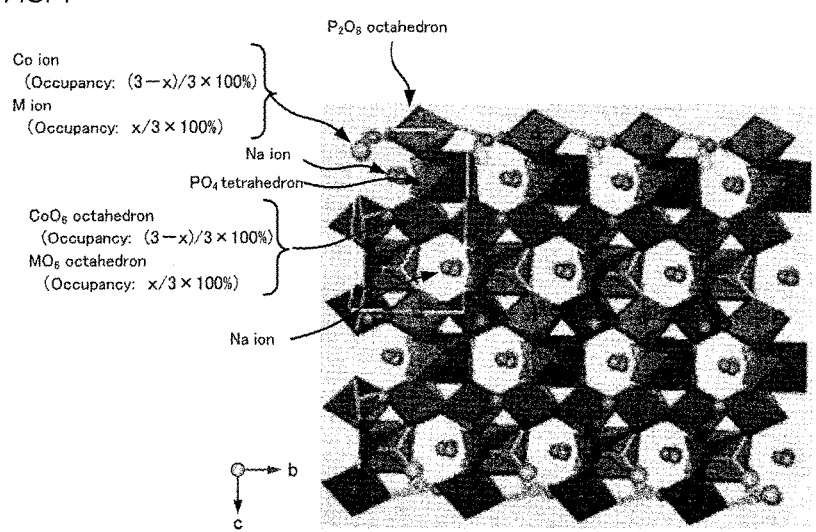
FIG. 1 is a view of the crystal structure of $Na_4Co_{(3-x)}M_x(PO_4)_2P_2O_7$ (space group $Pn2_1a$) viewed from the a-axis direction.
Figure 2:
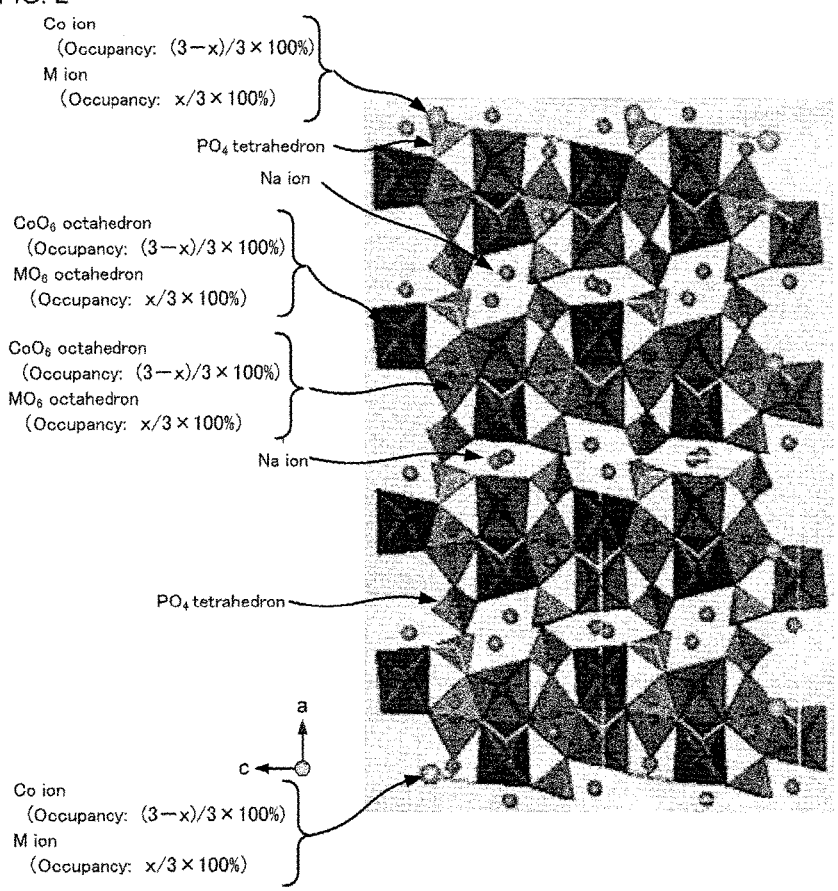
FIG. 2 is a view of the crystal structure of $Na_4Co_{(3-x)}M_x(PO_4)_2P_2O_7$ (space group $Pn2_1a$) viewed from the b-axis direction.
Figure 3:
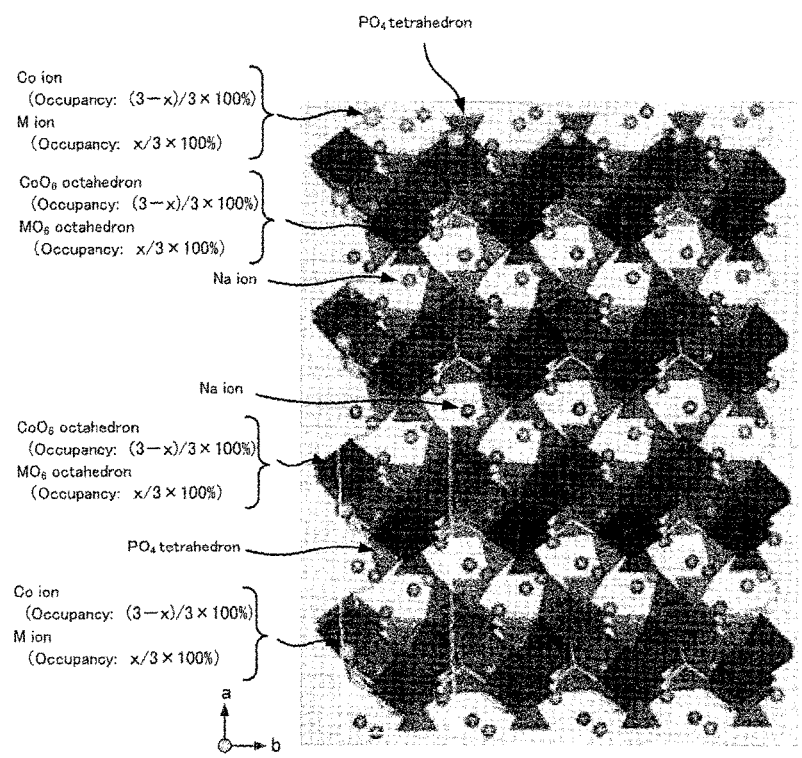
FIG. 3 is a view of the crystal structure of $Na_4Co_{(3-x)}M_x(PO_4)_2P_2O_7$ (space group $Pn2_1a$) viewed from the c-axis direction.

FIGS. 1 to 3 are views of the crystal structure belonging to the space group $Pn2_1a$ ($Na_4Co_{(3-x)}M_x(PO_4)_2P_2O_7$) viewed from the a-axis direction (FIG. 1), that from the b-axis direction (FIG. 2), and that from the c-axis direction (FIG. 3). In $Na_4Co_{(3-x)}M_x(PO_4)_2P_2O_7$, M is the metal substituted with a part of Co, and it is Fe in the first cathode active material for sodium batteries.

In FIGS. 1 to 3, the occupancy of Co ions and the occupancy of M ions, and the occupancy of $CoO_6$ octahedrons and the occupancy of $MO_6$ octahedrons vary depending on the value of the substitution amount x of Co with M.

That is, the occupancy of Co ions and the occupancy of $CoO_6$ octahedrons are (3-x)/3×100% each, and the occupancy of M ions and the occupancy of $MO_6$ octahedrons are x/3×100% each.

In the first cathode active material for sodium batteries, the occupancy of Co ions and the occupancy of $CoO_6$ octahedrons are (3-x)/3×100% ($0.015 \leq x \leq 0.21$) each, and the occupancy of M ions (i.e., Fe ions) and the occupancy of $MO_6$ octahedrons (i.e., $FeO_6$ octahedrons) is x/3×100% ($0.015 \leq x \leq 0.21$) each.

As is clear from FIGS. 1 to 3, in the crystal structure belonging to the space group $Pn2_1a$, all Na ions in the crystal structure are aligned in any of the a-axis, b-axis and c-axis directions and have very high mobility. That is, the crystal structure belonging to the space group $Pn2_1a$ is very favorable for Na ion conduction, and Na ion insertion/desorption proceed smoothly.

Due to the above reasons, the first cathode active material for sodium batteries preferably has the crystal structure belonging to the space group $Pn2_1a$.

The crystal structure belonging to the space group $Pn2_1a$ is the same as a crystal structure belonging to space group $Pna2_1$ in which the lattice axes are changed to represent the symmetry of the crystal structure.

It can be confirmed by X-ray diffraction that the cathode active material for sodium batteries has the crystal structure belonging to the space group $Pn2_1a$.

(The Second Cathode Active Material for Sodium Batteries)

The second cathode active material for sodium batteries is represented by the general formula $Na_4Co_{(3-x)}Cr_x(PO_4)_2P_2O_7$ ($0.03 \leq x \leq 0.18$).

In the second cathode active material for sodium batteries, x (the substitution amount of Co with Cr) is required to be within a range of $0.03 \leq x \leq 0.18$. From the point of view that higher discharge capacity and high charge-discharge efficiency can be obtained, preferred is $0.09 \leq x$, and particularly preferred is $0.12 \leq x$. From the same point of view, preferred is $x \leq 0.15$.

Due to the same reason as the first cathode active material for sodium batteries, the second cathode active material for sodium batteries preferably has a crystal structure belonging to space group $Pn2_1a$. In FIGS. 1 to 3, the crystal structure of the second cathode active material for sodium batteries which has the crystal structure belonging to the space group $Pn2_1a$ when M is Cr, is shown. For the occupancies shown in FIGS. 1 to 3, in the second cathode active material for sodium batteries which has the crystal structure belonging to the space group $Pn2_1a$, the occupancy of Co ions and the occupancy of $CoO_6$ octahedrons are (3-x)/3×100% ($0.03 \leq x \leq 0.18$) each, and the occupancy of Cr ions and the occupancy of $CrO_6$ octahedron are x/3×100% ($0.03 \leq x \leq 0.18$) each.

(The Third Cathode Active Material for Sodium Batteries)

The third cathode active material for sodium batteries is represented by the general formula $Na_4Co_{(3-x)}Mn_x(PO_4)_2P_2O_7$ ($0.006 \leq x \leq 0.24$).

In the third cathode active material for sodium batteries, x (the substitution amount of Co with Mn) is required to be within a range of $0.006 \leq x \leq 0.24$. From the point of view that higher discharge capacity and high charge-discharge efficiency can be obtained, preferred is $0.03 \leq x$. From the same point of view, preferred is $x \leq 0.15$.

Due to the same reason as the first cathode active material for sodium batteries, the third cathode active material for sodium batteries preferably has a crystal structure belonging to space group $Pn2_1a$. In FIGS. 1 to 3, the crystal structure of the third cathode active material for sodium batteries which has the crystal structure belonging to the space group $Pn2_1a$ when M is Mn, is shown. For the occupancies shown in FIGS. 1 to 3, in the third cathode active material for sodium batteries which has the crystal structure belonging to the space group $Pn2_1a$, the occupancy of Co ions and the occupancy of $CoO_6$ octahedrons are (3-x)/3×100% ($0.006 \leq x \leq 0.24$) each, and the occupancy of Mn ions and the occupancy of $MnO_6$ octahedrons are x/3×100% ($0.006 \leq x \leq 0.24$) each.

(The Fourth Cathode Active Material for Sodium Batteries)

The fourth cathode active material for sodium batteries is represented by the general formula $Na_4Co_{(3-x)}Al_x(PO_4)_2P_2O_7$ ($0.03 \leq x \leq 0.06$).

In the fourth cathode active material for sodium batteries, x (the substitution amount of Co with Al) is required to be within a range of $0.03 \leq x \leq 0.06$.

Due to the same reason as the first cathode active material for sodium batteries, the fourth cathode active material for sodium batteries preferably has a crystal structure belonging to space group $Pn2_1a$. In FIGS. 1 to 3, the crystal structure of the fourth cathode active material for sodium batteries which has the crystal structure belonging to the space group $Pn2_1a$ when M is Al, is shown. For the occupancies shown in FIGS. 1 to 3, in the fourth cathode active material for sodium batteries which has the crystal structure belonging to the space group $Pn2_1a$, the occupancy of Co ions and the occupancy of $CoO_6$ octahedrons are (3-x)/3×100%

(0.03≤x≤0.06) each, and the occupancy of Al ions and the occupancy of $AlO_6$ octahedrons are x/3×100% (0.03≤x≤0.06) each.

The cathode active material for sodium batteries of the present invention (the first, second, third and fourth cathode active materials for sodium batteries) is preferably in a particulate form. From the viewpoint of increasing $Na^+$ diffusivity inside the cathode active material particles, the cathode active material is particularly preferably in a particulate form having an average particle diameter of 10 μm or less, more preferably 3 μm or less. On the other hand, from the viewpoint of electrolyte stability and active material stability, generally, the average particle diameter is preferably 10 nm or more.

In the present invention, the average particle diameter of the cathode active material for sodium batteries can be measured by observation with a scanning electron microscope (SEM) or transmission electron microscope (TEM).

The cathode active material for sodium batteries according to the present invention can be produced by the following method, for example. First, a Na-containing compound (Na source), a Co-containing compound (Co source), a substitution element-containing compound (substitution element source) such as Fe-containing compound, Cr-containing compound, Mn-containing compound or Al-containing compound, and a P-containing compound (P source) are dissolved in an acidic solution. A gelling agent is added to the mixture, and then the mixture is heated to volatilize moisture, thereby preparing a gel. Next, the gel thus obtained is calcined under the air atmosphere.

The Na-containing compound, the Co-containing compound, the substitution element-containing compound, and the P-containing compound are required to be soluble in acidic solution and can be appropriately selected. Each compound can be a single compound or a combination of compounds. Or, one compound can contain two or more of Na, Co, the substitution element and P.

In particular, as the Na-containing compound, there may be mentioned $Na_4P_2O_7$, $Na_2CO_3$, $Na_2O$, $Na_2O_2$, $CH_3COONa$ and hydrates thereof, for example.

As the Co-containing compound, there may be mentioned $CoCO_3$, $(CH_3COO)_2Co$, $Co_2O_3$ and hydrates thereof, for example.

As the P-containing compound, there may be mentioned $NH_4H_2PO_4$, $(NH_4)_2HPO_4$ and $H_3PO_4$, for example.

As the substitution element-containing compound and the Fe-containing compound, there may be mentioned $Fe(NO_3)_3$, $FeC_2O_4$, $(CH_3COO)_3Fe$ and hydrates thereof, for example. As the Cr-containing compound, there may be mentioned $Cr(NO_3)_3$, $CrO_3$ and hydrates thereof, for example. As the Mn-containing compound, there may be mentioned $(CH_3OOO)_3Mn$, $Mn(NO_3)_2$, $MnCO_3$, $MnO$ and hydrates thereof, for example. As the Al-containing compound, there may be mentioned $Al(NO_3)_3$, $(CH_3COO)_3Al$, $Al(OH)_3$, $Al_2O_3$ and hydrates thereof, for example.

In the gel preparation, the mix ratio of the Na-containing compound, the Co-containing compound, the substitution element-containing compound and the P-containing compound can be appropriately determined, depending on the stoichiometric ratio of the elements in the cathode active material to be synthesized. In particular, in the case of synthesizing $Na_4Co_{(3-x)}Fe_x(PO_4)_2P_2O_7$, the compounds can be mixed so that the ratio of Na, Co, Fe and P (mol ratio) in the gel is Na/Co/Fe/P=4/3-x/x/4. In the case of synthesizing $Na_4Co_{(3-x)}Cr_x(PO_4)_2P_2O_7$, the compounds can be mixed so that the ratio of Na, Co, Cr and P (mot ratio) in the gel is Na/Co/Cr/P=4/3-x/x/4. In the case of synthesizing $Na_4Co_{(3-x)}Mn_x(PO_4)_2P_2O_7$, the compounds can be mixed so that the ratio of Na, Co, Mn and P (mol ratio) in the gel is Na/Co/Mn/P=4/3-x/x/4. In the case of synthesizing $Na_4Co_{(3-x)}Al_x(PO_4)_2P_2O_7$, the mixture can be mixed so that the ratio of Na, Co, Al and P (mol ratio) in the gel is Na/Co/Al/P=4/3-x/x/4.

As the gelling agent, there may be mentioned glycolic acid for example. As the acidic solution, there may be mentioned nitric acid aqueous solution, for example.

In the gel preparation, the heating temperature is required to be a temperature at which the compounds can be dissolved in the acidic solution to prepare the gel. For example, the heating temperature can be 60 to 120° C.

The gel calcining temperature can be 500 to 800° C., for example, and it is preferably 600 to 750° C. The calcining time is not particularly limited. For example, it can be 1 to 100 hours. In the gel calcination, the air atmosphere means an oxygen-containing gas atmosphere.

From the viewpoint of obtaining the cathode active material in a fine particulate form, preferably, the cathode active material obtained after the calcination is mixed with electroconductive carbon particles, kneaded and then calcined under an inert atmosphere.

By mixing and kneading with the electroconductive carbon particles, the cathode active material can be formed into fine particles. By mixing and kneading with the electroconductive carbon particles, the crystallinity of the cathode active material may be decreased; however, by calcining the cathode active material under an inert atmosphere after the mixing and kneading, the decreased crystallinity of the cathode active material can be increased. Since the electroconductive carbon particles serve as a conductive additive in the cathode, they can be used as a material for constituting the cathode, in combination with the cathode active material.

The electroconductive carbon particles are not particularly limited, as long as they are a carbonaceous material with electron conductivity. For example, there may be mentioned acetylene black, graphite, Ketjen Black, carbon nanotubes and carbon nanofibers.

The ratio of the cathode active material and the electroconductive carbon particles to be mixed and kneaded is not particularly limited. It is preferably in a range of the cathode active material and the electroconductive material in the cathode active material layer. For example, from the viewpoint of promoting electron conductivity inside electrodes, the electroconductive carbon particles are preferably 1 part by weight or more, particularly preferably 3 parts by weight or more, with respect to 100 parts by weight of the cathode active material. From the viewpoint of energy density, the electroconductive carbon particles are preferably 40 parts by weight or less, particularly preferably 30 parts by weight or less, with respect to 100 parts by weight of the cathode active material.

The method for mixing and kneading the cathode active material and the electroconductive carbon particles is not particularly limited. For example, there may be mentioned methods such as a bead mill, a ball mill and a hand mill.

[Sodium Battery]

The cathode active material provided by the present invention can be preferably used as the cathode active material of a sodium battery. The sodium battery can be either a primary or secondary battery. Since the cathode active material of the present invention is excellent in reversibility upon charging, it is particularly useful as a secondary battery. Hereinafter, taking a sodium secondary battery as an example, a sodium battery using the cathode active material provided by the present invention will be described.

Figure 4:
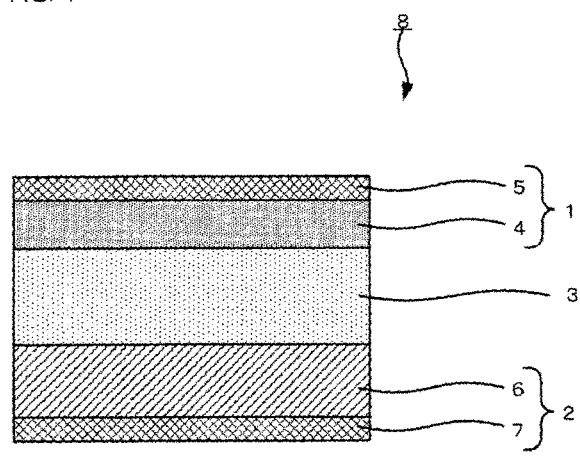
FIG. 4 is a schematic sectional view of an embodiment example of a sodium battery.

FIG. 4 is a schematic sectional view of an embodiment example of a sodium secondary battery. As shown in FIG. 4, a sodium secondary battery B generally has a structure that an electrolyte layer 3 is disposed between an anode 1 and a cathode 2. The anode 1 has an anode active material layer 4, which contains an anode active material, and an anode current collector 5, which collects current from the anode active material layer 4. The cathode 2 has a cathode active material layer 6, which contains a cathode active material, and a cathode current collector 7, which collects current from the cathode active material layer 6.

Hereinafter, these components will be described.

The cathode contains the cathode active material which is able to release/take in sodium ions. In general, the cathode has the cathode active material layer which contains at least the cathode active material. As needed, the cathode further has the cathode current collector which collects current from the cathode active material layer.

In the sodium battery of the present invention, the cathode contains the above-described cathode active material of the present invention. Typically, the cathode has the cathode active material layer which contains the cathode active material of the present invention. The cathode active material will not be described here since it is described above under "Cathode active material for sodium batteries".

The cathode active material layer can be a layer which contains only the cathode active material, or it can be a layer which contains the cathode active material and a binder, an electroconductive material, an electrolyte, etc. For example, when the cathode active material is in a plate form, a foil form or the like, the cathode active material layer can be a layer that contains only the cathode active material layer.

On the other hand, when the cathode active material is in a particulate form, the cathode active material layer can be a layer that contains the cathode active material and a binder. The content of the cathode active material in the cathode active material layer is not particularly limited. However, when the weight of the cathode active material layer is 100, it is preferably in a range of 60 to 98 parts by weight.

As the binder, for example, there may be mentioned polyvinylidene fluoride (PVdF), polytetrafluoroethylene (PTFE) and styrene-butadiene rubber (SBR). The content of the binder in the cathode active material layer is not particularly limited. However, when the weight of the cathode active material layer is 100, it is preferably in a range of 1 to 20 parts by weight.

As the electroconductive material, for example, there may be mentioned carbonaceous materials such as carbon black, activated carbon, carbon fibers (e.g., carbon nanotubes, carbon nanofibers) and graphite. The content of the electroconductive material in the cathode active material layer is not particularly limited. However, when the weight of the cathode active material layer is 100, it is preferably in a range of 1 to 20 parts by weight.

The anode contains the anode active material which is able to release/take in sodium ions. In general, the anode has the anode active material layer which contains at least the anode active material. As needed, the anode further has the anode current collector which collects current from the anode active material layer.

As the anode active material, for example, there may be mentioned hard carbon, Na metals and tin.

As with the cathode active material layer, the anode active material layer can be a layer which contains only the anode active material, or it can be a layer which contains the anode active material and an electroconductive material, a binder, an electrolyte, etc.

The electroconductive material and the binder in the anode active material will not be described here, since the same materials as the cathode active material layer can be used as them.

Each of the cathode active material layer and the anode active material layer can be formed by applying a slurry which contains the above materials by any application method such as a dip coating method, a spray coating method, a roll coating method, a doctor blade method, a gravure coating method or a screen printing method, drying the applied slurry and, as needed, roll-pressing it.

The material for the cathode current collector, the material for the anode current collector, and the structure and form of the cathode and anode current collectors are not particularly limited, as long as they have desired electron conductivity and do not cause an alloying reaction with sodium ions under the environment inside the battery.

As the material for the cathode current collector, for example, there may be mentioned metal materials such as stainless-steel, nickel, aluminum, iron, titanium and copper; carbonaceous materials such as carbon fiber and carbon paper; and ceramic materials with high electron conductivity, such as titanium nitride. A battery case is allowed to function as the cathode current collector.

As the material for the anode current collector, there may be mentioned copper, stainless-steel, nickel, aluminum, etc. A battery case is allowed to function as the anode current collector.

As the form of the cathode and anode current collectors, for example, there may be mentioned a plate form, a foil form and a mesh form.

The electrolyte layer contains at least an electrolyte which is able to conduct sodium ions between the cathode and the anode.

The electrolyte is required to have sodium ion conductivity. The examples include a liquid electrolyte, a gelled electrolyte obtained by gelling a liquid electrolyte using a polymer, and a solid electrolyte.

As the liquid electrolyte having sodium ion conductivity, for example, there may be mentioned an aqueous liquid electrolyte obtained by dissolving a sodium salt in an aqueous solvent, and a non-aqueous liquid electrolyte obtained by dissolving a sodium salt in a non-aqueous solvent.

The non-aqueous solvent is not particularly limited. The examples include cyclic carbonates such as propylene carbonate (PC), ethylene carbonate (EC) and fluoroethylene carbonate (FEC); cyclic esters such as γ-butyrolactone (GBL); and chain carbonates such as dimethyl carbonate (DMC), diethyl carbonate (DEC) and ethyl methyl carbonate (EMC). These non-aqueous solvents can be used alone or in combination of two or more. A mixture of the non-aqueous solvent and a nitrile-based compound can be used, which is such a compound that a CN group is bound to a terminal of a chain saturated hydrocarbon compound. By adding the nitrile-based compound to the non-aqueous liquid electrolyte, a stable non-aqueous liquid electrolyte can be obtained, which is not decomposable even in a high potential range in which the cathode active material for the sodium batteries according to the present invention works.

The sodium salt is not particularly limited. The examples include $NaPF_6$, $NaBF_4$, $NaClO_4$, $NaCF_3SO_3$, $(CF_3SO_2)_2NNa$, $NaN(FSO_2)$ and $NaC(CF_3SO_2)_3$. They can be used alone or in combination of two or more. $NaPF_6$ is particularly preferred, which is stable even in the high potential range.

In the non-aqueous liquid electrolyte, the concentration of the sodium salt is not particularly limited.

The non-aqueous liquid electrolyte can be gelled and used by adding a polymer thereto. To gel the non-aqueous liquid electrolyte, for example, there may be mentioned a method of adding a polymer such as polyethylene oxide (PEO), polyacrylonitrile (PAN), polyvinylidene fluoride (PVdF) or polymethyl methacrylate (PMMA) to the non-aqueous liquid electrolyte.

In the case of using the liquid electrolyte as the electrolyte, the cathode and the anode can be insulated from each other by disposing a separator between the cathode and the anode, the separator being an insulating porous material, and impregnating the separator with the liquid electrolyte. As the separator, for example, there may be mentioned porous films such as a polyethylene porous film and a polypropylene porous film, and non-woven fabrics such as a resin non-woven fabric and a glass fiber non-woven fabric.

As the battery case for housing the anode, the electrolyte layer and the cathode, for example, there may be used a battery case which has a general form such as a coin form, a flat plate form, a cylindrical form or a laminate form.

In the case of a battery which has a structure of stacked laminates each comprising the cathode, the electrolyte layer and the anode in this sequence, a separator made of an insulating material can be provided between the cathode and the anode, from the viewpoint of safety. As such a separator, for example, there may be mentioned porous films such as a polyethylene porous film and a polypropylene porous film, and non-woven fabrics such as a resin non-woven fabric and a glass fiber non-woven fabric.

A terminal can be provided to the current collector of each electrode, which serves as a connection to the outside.

EXAMPLES

Synthesis of $Na_4Co_{(3-x)}Fe_x(PO_4)_2P_2O_7$

Examples 1 to 8

As starting materials, $(CH_3COO)_2Co\cdot 4H_2O$, $Fe(NO_3)_3\cdot 9H_2O$, $Na_4P_2O_7\cdot 10H_2O$ and $NH_4H_2PO_4$ in the amounts (mg) shown in Table 1 below were dissolved in a nitric acid aqueous solution.

To the solution, glycolic acid was added as a gelling material and stirred at 80° C. After the moisture was volatilized, the gel thus obtained was calcined under the air atmosphere at 700° C. for 50 hours, thereby synthesizing a cathode active material $(Na_4Co_{(3-x)}Fe_x(PO_4)_2P_2O_7)$.

For size reduction, 1.0 g of the thus-obtained cathode active material powder was mixed and kneaded with 0.2 g a first electroconductive carbon. Then, to increase the decreased crystallinity of the cathode active material, which was decreased by the mixing and kneading, the mixed and kneaded product was calcined again under an argon atmosphere at 700° C. for 5 hours.

The thus-obtained cathode active materials $(Na_4Co_{(3-x)}Fe_x(PO_4)_2P_2O_7)$ of Examples 1 to 8 were analyzed with an X-ray diffractometer (XRD). For each cathode active material, it was confirmed that x in $Na_4Co_{(3-x)}Fe_x(PO_4)_2P_2O_7$ has the composition of the value shown in Table 1 (x=0.015, 0.03, 0.045, 0.06, 0.09, 0.12, 0.15, 0.21).

It was also confirmed that the cathode active materials $(Na_4Co_{(3-x)}Fe_x(PO_4)_2P_2O_7)$ obtained in Examples 1 to 8 have a crystal structure belonging to space group $Pn2_1a$.

Comparative Examples 1 and 2

Cathode active materials $(Na_4Co_{(3-x)}Fe_x(PO_4)_2P_2O_7)$ were obtained in the same manner as Examples 1 to 8, except that the amounts (mg) of the starting materials were chanted to the amounts shown in Table 1.

The thus-obtained cathode active materials of Comparative Examples 1 and 2 $(Na_4Co_{(3-x)}Fe_x(PO_4)_2P_2O_7)$ were analyzed by XRD. For each cathode active material, it was confirmed that x in $Na_4Co_{(3-x)}Fe_x(PO_4)_2P_2O_7$ has the composition of the value shown in Table 1 (x=0, 0.3). It was also confirmed that the cathode active materials obtained in Comparative Examples 1 and 2 $(Na_4Co_{(3-x)}Fe_x(PO_4)_2P_2O_7)$ have a crystal structure belonging to the space group $Pn2_1a$.

TABLE 1

$Na_4Co_{(3-x)}Fe_x(PO_4)_2P_2O_7$

| | | Amounts (mg) | | | |
|---|---|---|---|---|---|
| | x | $(CH_3COO)_2Co\cdot 4H_2O$ | $Fe(NO_3)_3\cdot 9H_2O$ | $Na_4P_2O_7\cdot 10H_2O$ | $NH_4H_2PO_4$ |
| Comparative Example 1 | 0 | 7.4724 | 0 | 4.4606 | 2.3006 |
| Example 1 | 0.015 | 7.435 | 0.0606 | 4.4606 | 2.3006 |
| Example 2 | 0.03 | 7.3977 | 0.1212 | 4.4606 | 2.3006 |
| Example 3 | 0.045 | 7.3603 | 0.1818 | 4.4606 | 2.3006 |
| Example 4 | 0.06 | 7.323 | 0.2424 | 4.4606 | 2.3006 |
| Example 5 | 0.09 | 7.2482 | 0.3636 | 4.4606 | 2.3006 |
| Example 6 | 0.12 | 7.1735 | 0.4848 | 4.4606 | 2.3006 |
| Example 7 | 0.15 | 7.0988 | 0.606 | 4.4606 | 2.3006 |
| Example 8 | 0.21 | 6.9493 | 0.8484 | 4.4606 | 2.3006 |
| Comparative Example 2 | 0.3 | 6.7252 | 1.212 | 4.4606 | 2.3006 |

Evaluation of $Na_4Co_{(3-x)}Fe_x(PO_4)_2P_2O_7$

Examples 1 to 8, Comparative Examples 1 and 2

<Production of Cathode>

The mixed, kneaded and calcined product of each of the cathode active materials of Examples 1 to 8 with the first electroconductive carbon, was mixed with a second electroconductive carbon (a conductive additive) and PVdF (a binder) and dispersed in N-methyl-2-pyrrolidone (a dispersant), thereby preparing a slurry.

The slurry was prepared by mixing the components at the following ratio: the cathode active material/the electroconductive carbon (the first electroconductive carbon in the mixed, kneaded and calcined product and the added second electroconductive carbon)/PVdF=75/20/5 (weight ratio). That is, the slurry was prepared so that the breakdown of the weight ratio of the electroconductive carbon (20) is as follows: the first electroconductive carbon (15) and the second electroconductive carbon (5).

Each slurry was applied onto an aluminum foil (a current collector), dried and then roll-pressed, thereby obtaining a cathode made of a stack of the current collector and a cathode active material layer.
<Production of Sodium Secondary Battery>

An anode was cut out from a sodium metal foil.

Meanwhile, a sodium salt ($NaPF_6$) was added to a mixed solvent of ethylene carbonate (EC) and diethyl carbonate (DEC) at 1:1 (volume ratio), thereby preparing a non-aqueous solvent-based liquid electrolyte having a sodium salt concentration of 1.0 mol/dm$^3$.

Each of the cathodes produced above, a porous film (separator) made of a stack of a polypropylene porous film, a polyethylene porous film and a polypropylene porous film in this sequence, and the anode produced above were stacked in this sequence. At this time, the cathode was stacked so that the cathode active material layer was disposed on the separator side.

The separator of each laminate was impregnated with the non-aqueous solvent-based liquid electrolyte, thereby producing a sodium secondary battery in a coin form.

capacity than Comparative Example 1. The charge-discharge efficiency of Comparative Example 2 is higher than Comparative Example 1. This is because the charge capacity of Comparative Example 2 is low.

Synthesis of $Na_4Co_{(3-x)}Cr_x(PO_4)_2P_2O_7$

Examples 9 to 13, Comparative Example 3

Cathode active materials ($Na_4Co_{(3-x)}Cr_x(PO_4)_2P_2O_7$) were obtained in the same manner as Examples 1 to 8, except that $(OH_3COO)_2Co.4H_2O$, $Cr(NO_3)_3 \cdot 9H_2O$, $Na_4P_2O_7 \cdot 10H_2O$ and $NH_4H_2PO_4$ in the amounts (mg) shown in Table 2 below were used as starting materials.

The thus-obtained cathode active materials of Examples 9 to 13 and Comparative Example 3 were analyzed by XRD. For each cathode active material, it was confirmed that x in $Na_4Co_{(3-x)}Cr_x(PO_4)_2P_2O_7$ has the composition of the value shown in Table 2 (Examples 9 to 13: x=0.03, 0.09, 0.12, 0.15, 0.18, Comparative Example 3: x=0.21). Table 2 also shows the composition of Comparative Example 1. It was also confirmed that the cathode active materials obtained in Examples 9 to 13 and Comparative Example 3 have a crystal structure belonging to space group $Pn2_1a$.

TABLE 2

| | | $Na_4Co_{(3-x)}Cr_x(PO_4)_2P_2O_7$ | | | |
|---|---|---|---|---|---|
| | | Amounts (mg) | | | |
| | x | $(CH_3COO)_2Co \cdot 4H_2O$ | $Cr(NO_3)_3 \cdot 9H_2O$ | $Na_4P_2O_7 \cdot 10H_2O$ | $NH_4H_2PO_4$ |
| Comparative Example 1 | 0 | 7.4724 | 0 | 4.4606 | 2.3006 |
| Example 9 | 0.03 | 7.3977 | 0.12 | 4.4606 | 2.3006 |
| Example 10 | 0.09 | 7.2482 | 0.3601 | 4.4606 | 2.3006 |
| Example 11 | 0.12 | 7.1735 | 0.4802 | 4.4606 | 2.3006 |
| Example 12 | 0.15 | 7.0988 | 0.6002 | 4.4606 | 2.3006 |
| Example 13 | 0.18 | 7.0241 | 0.7203 | 4.4606 | 2.3006 |
| Comparative Example 3 | 0.21 | 6.9493 | 0.8403 | 4.4606 | 2.3006 |

<Evaluation Method>

Figure 5:
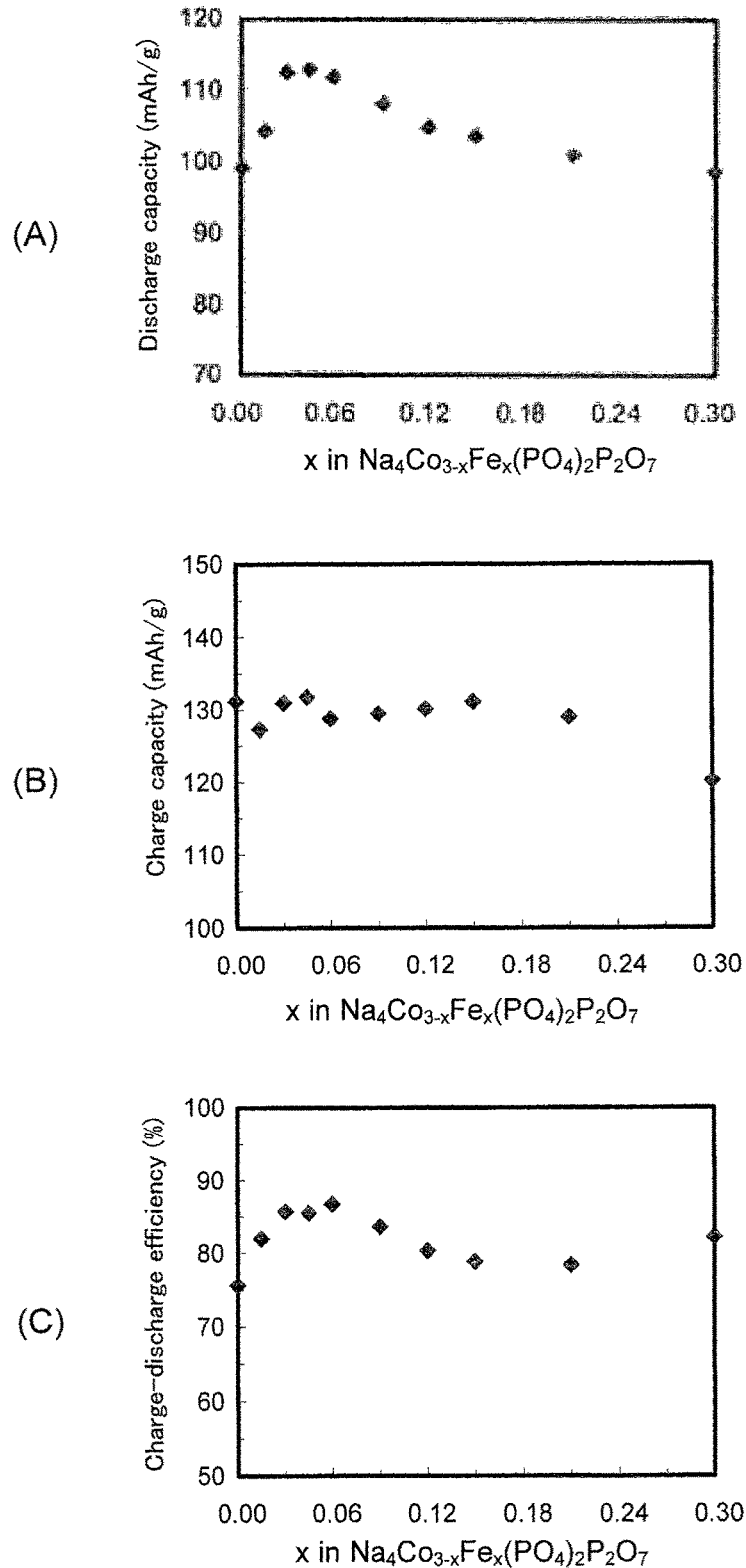
FIG. 5 shows a graph of discharge capacities of secondary batteries containing cathode active materials of Examples 1 to 8 and Comparative Examples 1 and 2.

Using each of the secondary batteries produced above, a charge-discharge test was carried out in the following condition. The discharge capacity, charge capacity and charge-discharge efficiency of the first cycle are shown in (A), (B) and (C) in FIG. 5. In FIG. 5, the horizontal axis is x in $Na_4Co_{(3-x)}Fe_x(PO_4)_2P_2O_7$. The charge-discharge efficiency was calculated by discharge capacity/charge capacity×100%.

Potential range: Upper limit voltage 4.7 V, Lower limit voltage 2.0 V
Current density: 34 mA/g
Temperature: 25° C.

As shown in FIG. 5, Examples 1 to 8 (in which x in $Na_4Co_{(3-x)}Fe_x(PO_4)_2P_2O_7$ is in a range of 0.015≤x≤0.21) had higher discharge capacities than Comparative Example 1 (x=0). Also, Examples 1 to 8 showed higher charge-discharge efficiencies than Comparative Example 1. Of them, Examples 2 to 5 (in which x in $Na_4Co_{(3-x)}Fe_x(PO_4)_2P_2O_7$ is in a range of 0.03≤x≤0.09), especially Examples 2 to 4 (in which x in $Na_4Co_{(3-x)}Fe_x(PO_4)_2P_2O_7$ is in a range of 0.03≤x≤0.06) had particularly high discharge capacities and excellent charge-discharge efficiencies.

On the other hand, Comparative Example 2 (x in $Na_4Co_{(3-x)}Fe_x(PO_4)_2P_2O_7$ is 0.3) showed a lower discharge Evaluation of $Na_4Co_{(3-x)}Cr_x(PO_4)_2P_2O_7$ Examples 9 to 13, Comparative Example 3

Figure 6:
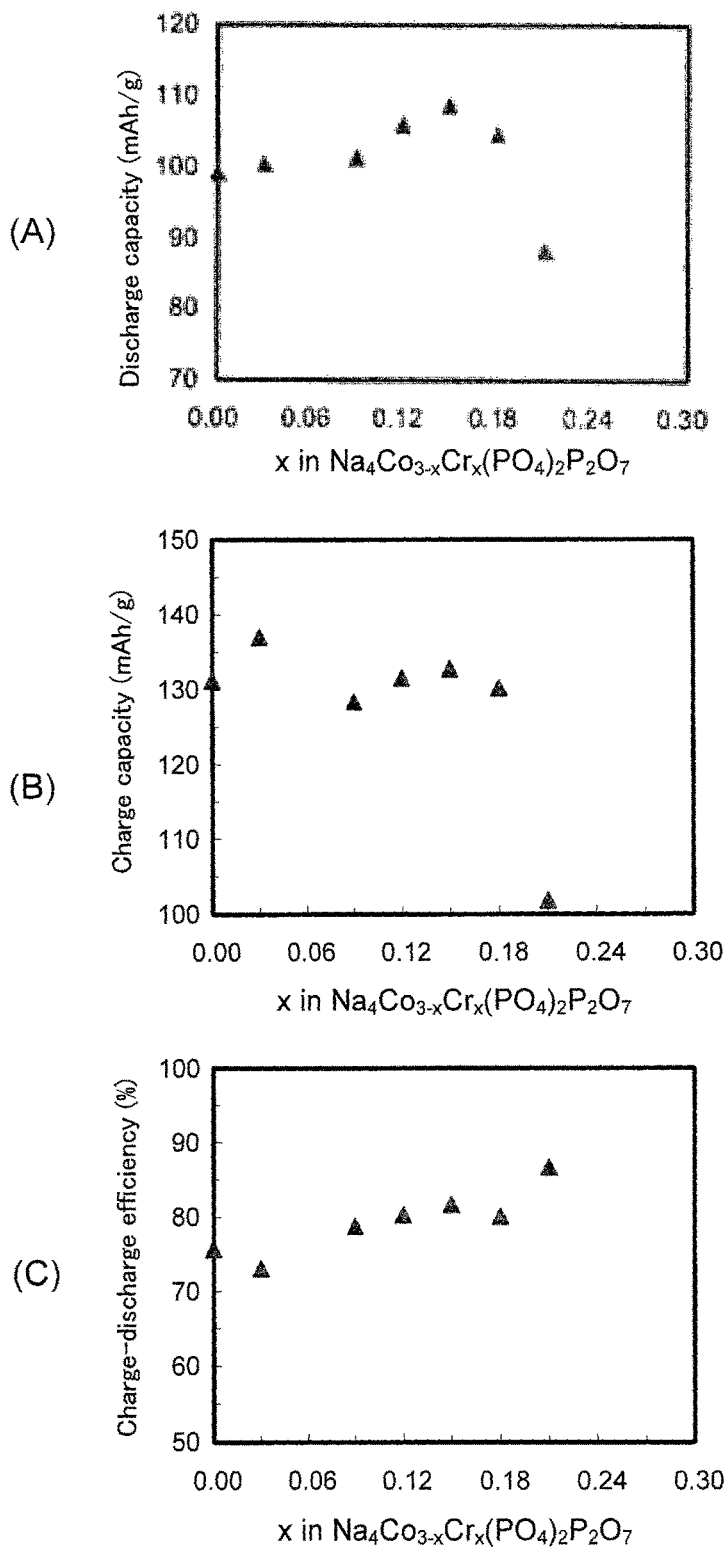
FIG. 6 shows a graph of discharge capacities of secondary batteries containing cathode active materials of Examples 9 to 13 and Comparative Examples 1 and 3.

In the same manner as Examples 1 to 8 and Comparative Examples 1 and 2, the cathode and the sodium secondary battery were produced, and the charge-discharge test was carried out thereon. The discharge capacity, charge capacity and charge-discharge efficiency of the first cycle are shown in (A), (B) and (C) in FIG. 6. In FIG. 6, the horizontal axis is x in $Na_4Co_{(3-x)}Cr_x(PO_4)_2P_2O_7$. FIG. 6 also shows the results of Comparative Example 1.

As shown in FIG. 6, Examples 9 to 13 (in which x in $Na_4Co_{(3-x)}Cr_x(PO_4)_2P_2O_7$ is in a range of 0.03≤x≤0.18) had higher discharge capacities than Comparative Example 1 (x=0). Also, Examples 10 to 13 showed higher charge-discharge efficiencies than Comparative Example 1. Of them, Examples 11 to 13 (in which x in $Na_4Co_{(3-x)}Cr_x(PO_4)_2P_2O_7$ is in a range of 0.12≤x≤0.18), especially Examples 11 and 12 (in which x in $Na_4Co_{(3-x)}Cr_x(PO_4)_2P_2O_7$ is in a range of 0.12≤x≤0.15) had particularly high discharge capacities and excellent charge-discharge efficiencies.

On the other hand, Comparative Example 3 (in which x in $Na_4Co_{(3-x)}Cr_x(PO_4)_2P_2O_7$ is 0.21) showed an extremely lower discharge capacity than Comparative Example 1. The charge-discharge efficiency of Comparative Example 3 is higher than Comparative Example 1 and Examples 9 to 13. This is because the charge capacity of Comparative Example 3 is very low.

Synthesis of $Na_4Co_{(3-x)}Cu_x(PO_4)_2P_2O_7$

Comparative Examples 4 to 6

Cathode active materials ($Na_4Co_{(3-x)}Cu_x(PO_4)_2P_2O_7$) were obtained in the same manner as Examples 1 to 8, except that $(CH_3COO)_2Co.4H_2O$, $(CH_3COO)_2Cu.H_2O$, $Na_4P_2O_7.10H_2O$ and $NH_4H_2PO_4$ in the amounts (mg) shown in Table 3 below were used as starting materials.

The thus-obtained cathode active materials of Comparative Examples 4 to 6 were analyzed by XRD. For each cathode active material, it was confirmed that x in $Na_4Co_{(3-x)}Cu_x(PO_4)_2P_2O_7$ has the composition of the value shown in Table 3 (x=0.03, 0.09, 0.15). Table 3 also shows the composition of Comparative Example 1. It was also confirmed that the cathode active materials obtained in Comparative Examples 4 to 6 have a crystal structure belonging to space group $Pn2_1a$.

Figure 7:
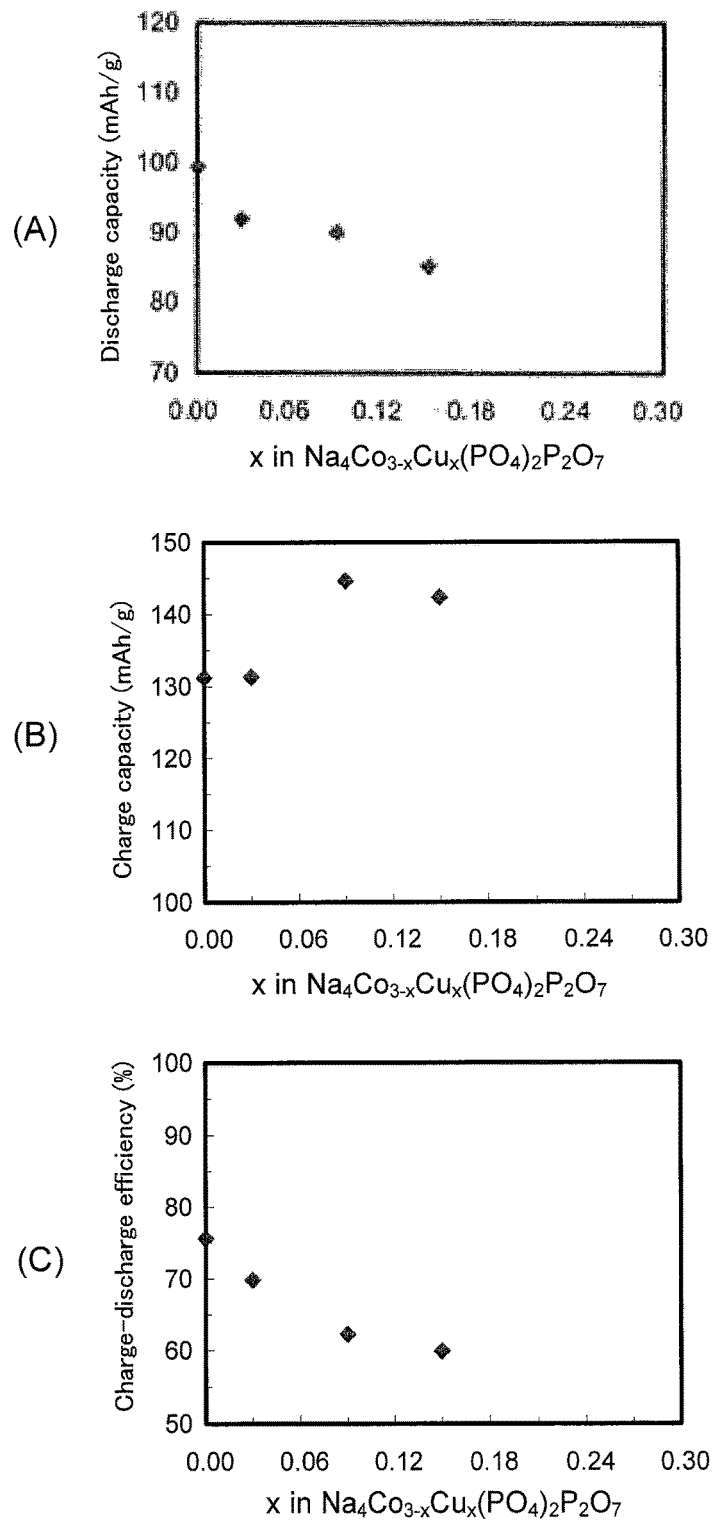
FIG. 7 shows a graph of discharge capacities of secondary batteries containing cathode active materials of Comparative Examples 1 and 4 to 6.

As shown in FIG. 7, Comparative Examples 4 to 6 (in which x in $Na_4Co_{(3-x)}Cu_x(PO_4)_2P_2O_7$ is larger than 0 (0.03≤x≤0.15)) had lower discharge capacities than Comparative Example 1 (x=0), and their discharge capacities showed a tendency to decrease as x increased. Also, compared to Comparative Example 1, the charge-discharge efficiencies of Comparative Examples 4 to 6 showed a tendency to decrease as x increased.

Synthesis of $Na_4Co_{(3-x)}Ca_x(PO_4)_2P_2O_7$

Comparative Examples 7 to 9

Cathode active materials ($Na_4Co_{(3-x)}Ca_x(PO_4)_2P_2O_7$) were obtained in the same manner as Examples 1 to 8, except that $(CH_3COO)_2Co.4H_2O$, $(CH_3COO)_2Ca.H_2O$, $Na_4P_2O_7.10H_2O$ and $NH_4H_2PO_4$ in the amounts (mg) shown in Table 4 below were used as starting materials.

The thus-obtained cathode active materials of Comparative Examples 7 to 9 were analyzed by XRD. For each cathode active material, it was confirmed that x in $Na_4Co_{(3-x)}Ca_x(PO_4)_2P_2O_7$ has the composition of the value shown in Table 4 (x=0.03, 0.09, 0.15). Table 4 also shows the composition of Comparative Example 1. It was also confirmed that the cathode active materials obtained in Comparative Examples 7 to 9 have a crystal structure belonging to space group $Pn2_1a$.

TABLE 3

$Na_4Co_{(3-x)}Cu_x(PO_4)_2P_2O_7$

| | | Amounts (mg) | | | |
|---|---|---|---|---|---|
| | x | $(CH_3COO)_2Co·4H_2O$ | $(CH_3COO)_2Cu·H_2O$ | $Na_4P_2O_7·10H_2O$ | $NH_4H_2PO_4$ |
| Comparative Example 1 | 0 | 7.4724 | 0 | 4.4606 | 2.3006 |
| Comparative Example 4 | 0.03 | 7.3977 | 0.0599 | 4.4606 | 2.3006 |
| Comparative Example 5 | 0.09 | 7.2482 | 0.1797 | 4.4606 | 2.3006 |
| Comparative Example 6 | 0.15 | 7.0986 | 0.2995 | 4.4606 | 2.3006 |

TABLE 4

$Na_4Co_{(3-x)}Ca_x(PO_4)_2P_2O_7$

| | | Amounts (mg) | | | |
|---|---|---|---|---|---|
| | x | $(CH_3COO)_2Co·4H_2O$ | $(CH_3COO)_2Ca·H_2O$ | $Na_4P_2O_7·10H_2O$ | $NH_4H_2PO_4$ |
| Comparative Example 1 | 0 | 7.4724 | 0 | 4.4606 | 2.3006 |
| Comparative Example 7 | 0.03 | 7.3977 | 0.0529 | 4.4606 | 2.3006 |
| Comparative Example 8 | 0.09 | 7.2482 | 0.1586 | 4.4606 | 2.3006 |
| Comparative Example 9 | 0.15 | 7.0988 | 0.2643 | 4.4606 | 2.3006 |

Evaluation of $Na_4Co_{(3-x)}Cu_x(PO_4)_2P_2O_7$

Comparative Examples 4 to 6

In the same manner as Examples 1 to 8 and Comparative Examples 1 and 2, the cathode and the sodium secondary battery were produced, and the charge-discharge test was carried out thereon. The discharge capacity, charge capacity and charge-discharge efficiency of the first cycle are shown in (A), (B) and (C) in FIG. 7. In FIG. 7, the horizontal axis is x in $Na_4Co_{(3-x)}Cu_x(PO_4)_2P_2O_7$. FIG. 7 also shows the results of Comparative Example 1.

Evaluation of $Na_4Co_{(3-x)}Ca_x(PO_4)_2P_2O_7$

Comparative Examples 7 to 9

Figure 8:
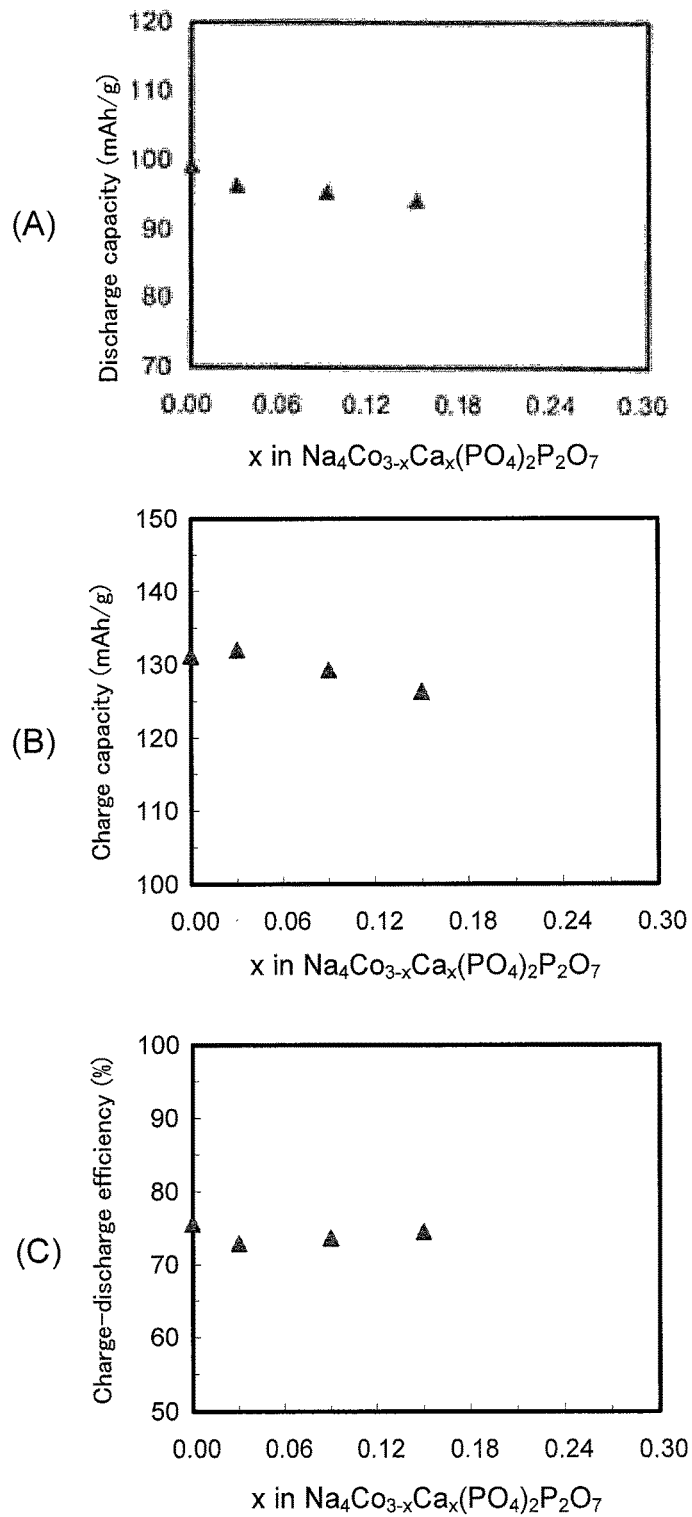
FIG. 8 shows a graph of discharge capacities of secondary batteries containing cathode active materials of Comparative Examples 1 and 7 to 9.

In the same manner as Examples 1 to 8 and Comparative Examples 1 and 2, the cathode and the sodium secondary battery were produced, and the charge-discharge test was carried out thereon. The discharge capacity, charge capacity and charge-discharge efficiency of the first cycle are shown in (A), (B) and (C) in FIG. 8. In FIG. 8, the horizontal axis is x in $Na_4CO_{3-x}Ca_x(PO_4)_2P_2O_7$. FIG. 8 also shows the results of Comparative Example 1.

As shown in FIG. 8, Comparative Examples 7 to 9 (in which x in $Na_4Co_{(3-x)}Ca_x(PO_4)_2P_2O_7$ is larger than 0 ($0.03 \leq x \leq 0.15$)) had lower discharge capacities than Comparative Example 1 (x=0), and their discharge capacities showed a tendency, to decrease as x increased. Also, the charge-discharge efficiencies of Comparative Examples 7 to 9 were lower than Comparative Example 1.

Synthesis of $Na_4Co_{3-x}Mg_x(PO_4)_2P_2O_7$

Comparative Examples 10 to 12

Cathode active materials ($Na_4Co_{(3-x)}Mg_x(PO_4)_2P_2O_7$) were obtained in the same manner as Examples 1 to 8, except that $(CH_3COO)_2Co \cdot 4H_2O$, $(CH_3COO)_2Mg \cdot 4H_2O$, $Na_4P_2O_7 \cdot 10H_2O$ and $NH_4H_2PO_4$ in the amounts (mg) shown in Table 5 below were used as starting materials.

The thus-obtained cathode active materials of Comparative Examples 10 to 12 were analyzed by XRD. For each cathode active material, it was confirmed that x in $Na_4Co_{(3-x)}Mg_x(PO_4)_2P_2O_7$ has the composition of the value shown in Table 5 (x=0.03, 0.09, 0.15). Table 5 also shows the composition of Comparative Example 1. It was also confirmed that the cathode active materials obtained in Comparative Examples 10 to 12 have a crystal structure belonging to space group $Pn2_1a$.

showed a tendency to decrease as x increased. Also, compared to Comparative Example 1, the charge-discharge efficiencies of Comparative Examples 10 to 12 showed a tendency to decrease as x increased.

Synthesis of $Na_4Co_{(3-x)}Zn_x(PO_4)_2P_2O_7$

Comparative Examples 13 to 15

Cathode active materials ($Na_4Co_{(3-x)}Zn_x(PO_4)_2P_2O_7$) were obtained in the same manner as Examples 1 to 8, except that $(CH_3COO)_2Co \cdot 4H_2O$, $(CH_3COO)_2Zn \cdot 2H_2O$, $Na_4P_2O_7 \cdot 10H_2O$ and $NH_4H_2PO_4$ in the amounts (mg) shown in Table 6 below were used as starting materials.

The thus-obtained cathode active materials of Comparative Examples 13 to 15 were analyzed by XRD. For each cathode active material, it was confirmed that x in

TABLE 5

$Na_4Co_{3-x}Mg_x(PO_4)_2P_2O_7$

| | | Amounts (mg) | | | |
|---|---|---|---|---|---|
| | x | $(CH_3COO)_2Co \cdot 4H_2O$ | $(CH_3COO)_2Mg \cdot 4H_2O$ | $Na_4P_2O_7 \cdot 10H_2O$ | $NH_4H_2PO_4$ |
| Comparative Example 1 | 0 | 7.4724 | 0 | 4.4606 | 2.3006 |
| Comparative Example 10 | 0.03 | 7.3977 | 0.0643 | 4.4606 | 2.3006 |
| Comparative Example 11 | 0.09 | 7.2482 | 0.193 | 4.4606 | 2.3006 |
| Comparative Example 12 | 0.15 | 7.0988 | 0.3217 | 4.4606 | 2.3006 |

Evaluation of $Na_4Co_{(3-x)}Mg_x(PO_4)_2P_2O_7$

Comparative Examples 10 to 12

Figure 9:
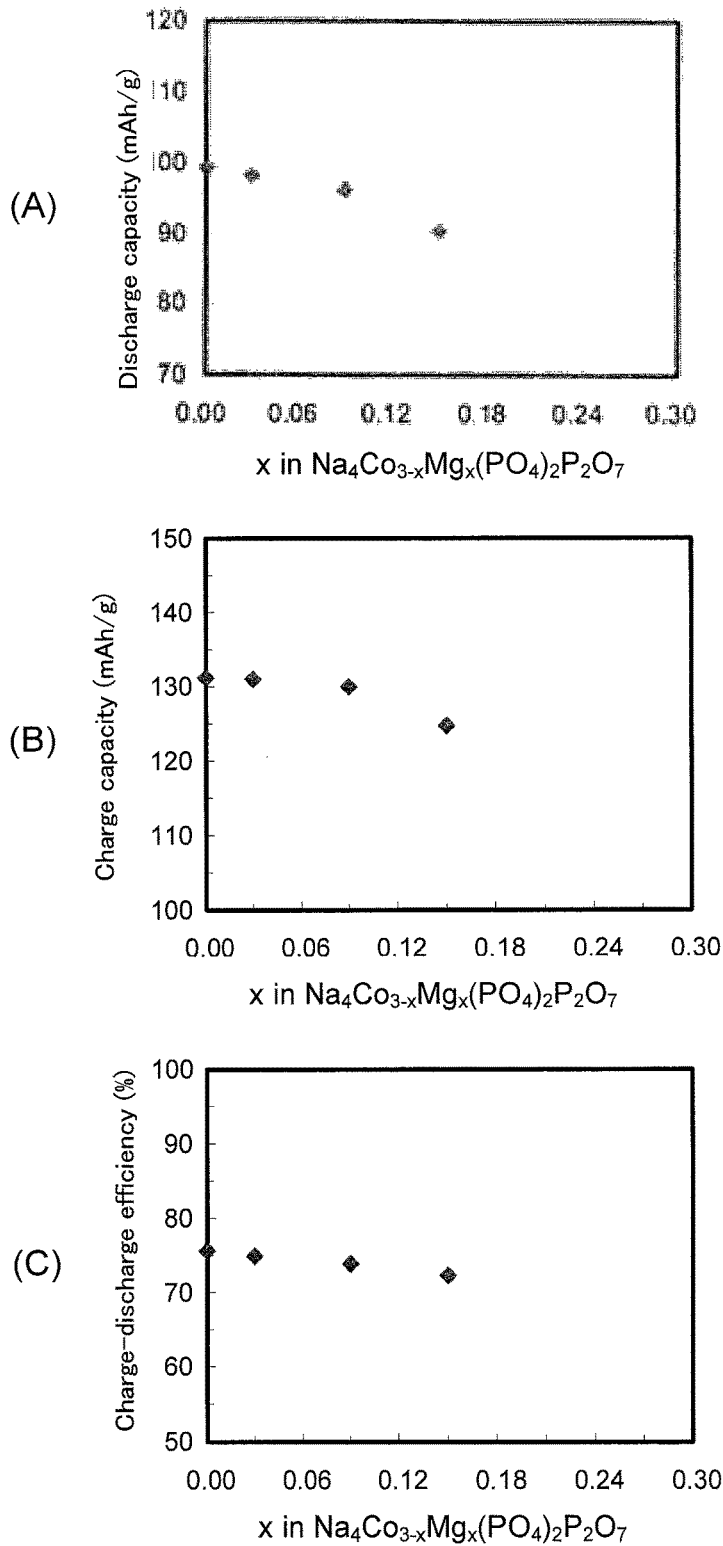
FIG. 9 shows a graph of discharge capacities of secondary batteries containing cathode active materials of Comparative Examples 1 and 10 to 12.

In the same manner as Examples 1 to 8 and Comparative Examples 1 and 2, the cathode and the sodium secondary battery were produced, and the charge-discharge test was carried out thereon. The discharge capacity, charge capacity and charge-discharge efficiency of the first cycle are shown in (A), (B) and (C) in FIG. 9. In FIG. 9, the horizontal axis is x in $Na_4Co_{(3-x)}Mg_x(PO_4)_2P_2O_7$. FIG. 9 also shows the results of Comparative Example 1.

As shown in FIG. 9, Comparative Examples 10 to 12 (in which x in $Na_4Co_{(3-x)}Mg_x(PO_4)_2P_2O_7$ is larger than 0 ($0.03 \leq x \leq 0.15$)) had lower discharge capacities than Comparative Example 1 (x=0), and their discharge capacities $Na_4Co_{(3-x)}Zn_x(PO_4)_2P_2O_7$ has the composition of the value shown in Table 6 (x=0.03, 0.09, 0.15). Table 6 also shows the composition of Comparative Example 1. It was also confirmed that the cathode active materials obtained in Comparative Examples 13 to 15 have a crystal structure belonging to space group $Pn2_1a$.

TABLE 6

$Na_4Co_{(3-x)}Zn_x(PO_4)_2P_2O_7$

| | | Amounts (mg) | | | |
|---|---|---|---|---|---|
| | x | $(CH_3COO)_2Co \cdot 4H_2O$ | $(CH_3COO)_2Zn \cdot 2H_2O$ | $Na_4P_2O_7 \cdot 10H_2O$ | $NH_4H_2PO_4$ |
| Comparative Example 1 | 0 | 7.4724 | 0 | 4.4606 | 2.3006 |
| Comparative Example 13 | 0.03 | 7.3977 | 0.0659 | 4.4606 | 2.3006 |
| Comparative Example 14 | 0.09 | 7.2482 | 0.1976 | 4.4606 | 2.3006 |
| Comparative Example 15 | 0.15 | 7.0988 | 0.3293 | 4.4606 | 2.3006 |

Evaluation of $Na_4Co_{(3-x)}Zn_x(PO_4)_2P_2O_7$

Comparative Examples 13 to 15

Figure 10:
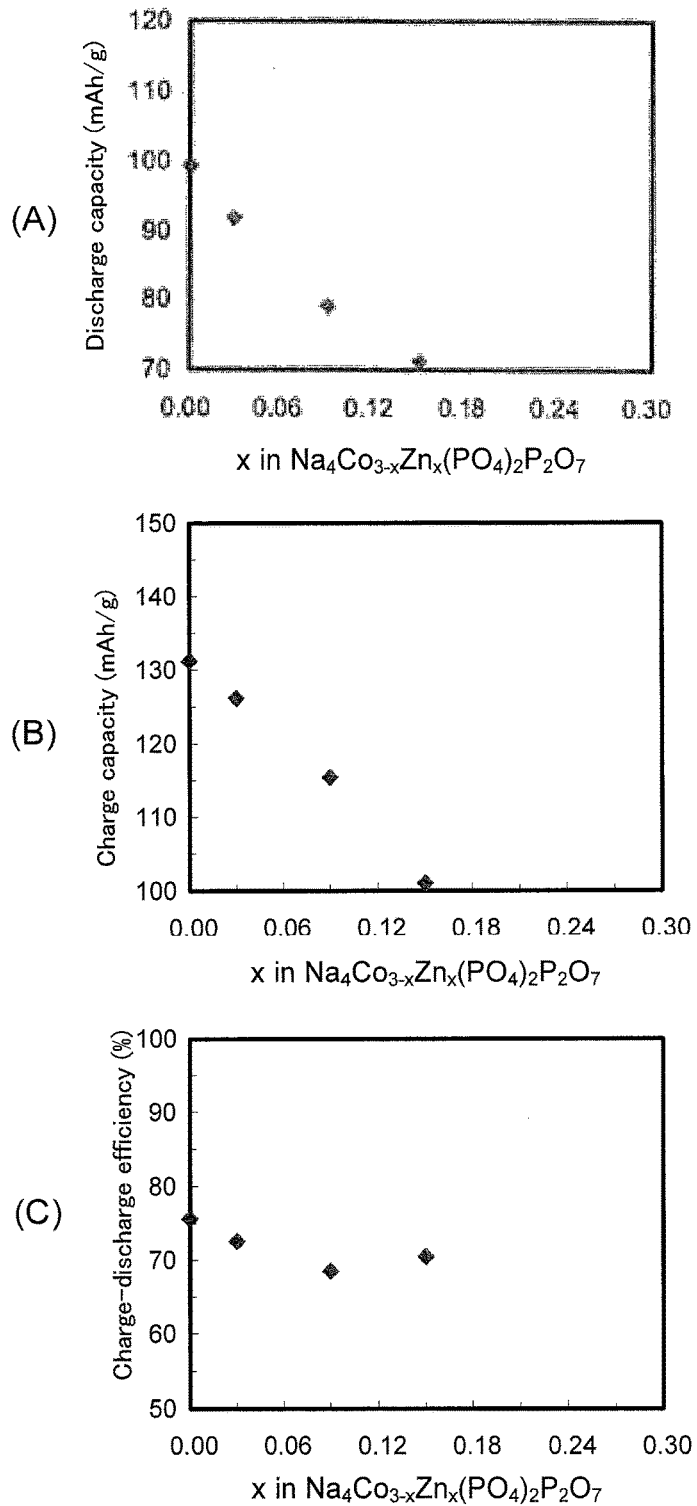
FIG. 10 shows a graph of discharge capacities of secondary batteries containing cathode active materials of Comparative Examples 1 and 13 to 15.

In the same manner as Examples 1 to 8 and Comparative Examples 1 and 2, the cathode and the sodium secondary battery were produced, and the charge-discharge test was carried out thereon. The discharge capacity, charge capacity and charge-discharge efficiency of the first cycle are shown in (A), (B) and (C) in FIG. 10. In FIG. 10, the horizontal axis is x in $Na_4Co_{(3-x)}Zn_x(PO_4)_2P_2O_7$. FIG. 10 also shows the results of Comparative Example 1.

As shown in FIG. 10, Comparative Examples 13 to 15 (in which x in $Na_4Co_{(3-x)}Zn_x(PO_4)_2P_2O_7$ is larger than 0 ($0.03 \leq x \leq 0.15$)) had lower discharge capacities than Comparative Example 1 (x=0), and their discharge capacities showed a tendency to decrease as x increased. The charge-discharge efficiencies of Comparative Examples 13 to 15 were also lower than Comparative Example 1.

Synthesis of $Na_4Co_{(3-x)}Mn_x(PO_4)_2P_2O_7$

Examples 14 to 19, Comparative Example 16

Cathode active materials ($Na_4Co_{(3-x)}Mn_x(PO_4)_2P_2O_7$) were obtained in the same manner as Examples 1 to 8, except that $(CH_3COO)_2Co \cdot 4H_2O$, $(CH_3COO)_2Mn \cdot 4H_2O$, $Na_4P_2O_7 \cdot 10H_2O$ and $NH_4H_2PO_4$ in the amounts (mg) shown in Table 7 below were used as starting materials.

Figure 11:
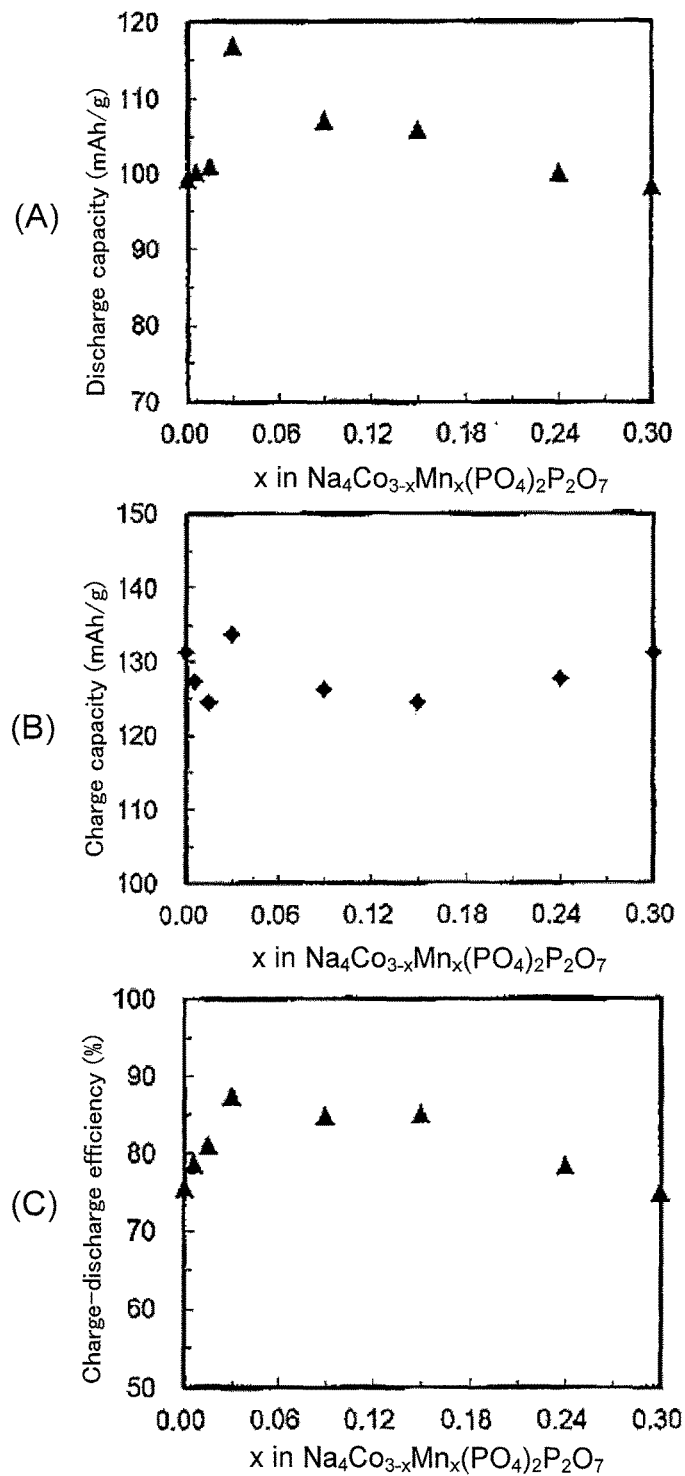
FIG. 11 shows a graph of discharge capacities of secondary batteries containing cathode active materials of Examples 14 to 19 and Comparative Examples 1 and 16.

The thus-obtained cathode active materials of Examples 14 to 19 and Comparative Example 16 were analyzed by XRD. For each cathode active material, it was confirmed that x in $Na_4Co_{(3-x)}Mn_x(PO_4)_2P_2O_7$ has the composition of the value shown in Table 7 (Examples 14 to 19: x=0.006, 0.015, 0.03, 0.09, 0.15, 0.24, Comparative Example 16: x=0.3). Table 7 also shows the composition of Comparative Example 1. It was also confirmed that the cathode active materials obtained in Examples 14 to 19 and Comparative Example 16 have a crystal structure belonging to space group $Pn2_1a$.

battery were produced, and the charge-discharge test was carried out thereon. The discharge capacity, charge capacity and charge-discharge efficiency of the first cycle are shown in (A), (B) and (C) in FIG. 11. In FIG. 11, the horizontal axis is x in $Na_4Co_{(3-x)}Mn_x(PO_4)_2P_2O_7$. FIG. 11 also shows the results of Comparative Example 1.

As shown in FIG. 11, Examples 14 to 19 (in which x in $Na_4Co_{(3-x)}Mn_x(PO_4)_2P_2O_7$ is in a range of $0.006 \leq x \leq 0.24$) had higher discharge capacities than Comparative Example 1 (x=0). Also, the charge-discharge efficiencies of Examples 14 to 19 were higher than Comparative Example 1. Of them, Examples 16 to 18 (in which x in $Na_4Co_{(3-x)}Mn_x(PO_4)_2P_2O_7$ is in a range of $0.03 \leq x \leq 0.15$) had particularly high discharge capacities and excellent charge-discharge efficiencies.

On the other hand, Comparative Example 16 (in which x in $Na_4Co_{(3-x)}Mn_x(PO_4)_2P_2O_7$ is 0.3) showed a lower discharge capacity than Comparative Example 1.

Synthesis of $Na_4Co_{(3-x)}Al_x(PO_4)_2P_2O_7$

Examples 20 and 21, Comparative Example 17

Cathode active materials ($Na_4Co_{(3-x)}Al_x(PO_4)_2P_2O_7$) were obtained in the same manner as Examples 1 to 8, except that $(CH_3COO)_2Co \cdot 4H_2O$, $Al(NO_3)_3 \cdot 9H_2O$, $Na_4P_2O_7 \cdot 10H_2O$ and $NH_4H_2PO_4$ in the amounts (mg) shown in Table 8 below were used as starting materials.

The thus-obtained cathode active materials of Examples 20 and 21 and Comparative Example 17 were analyzed by XRD. For each cathode active material, it was confirmed that x in $Na_4Co_{(3-x)}Al_x(PO_4)_2P_2O_7$ has the composition of

TABLE 7

| | | $Na_4Co_{(3-x)}Mn_x(PO_4)_2P_2O_7$ | | | |
|---|---|---|---|---|---|
| | | Amounts (mg) | | | |
| | x | $(CH_3COO)_2Co \cdot 4H_2O$ | $(CH_3COO)_2Mn \cdot 4H_2O$ | $Na_4P_2O_7 \cdot 10H_2O$ | $NH_4H_2PO_4$ |
| Comparative Example 1 | 0 | 7.4724 | 0 | 4.4606 | 2.3006 |
| Example 14 | 0.006 | 7.4575 | 0.0147 | 4.4606 | 2.3006 |
| Example 15 | 0.015 | 7.435 | 0.0368 | 4.4606 | 2.3006 |
| Example 16 | 0.03 | 7.3977 | 0.0735 | 4.4606 | 2.3006 |
| Example 17 | 0.09 | 7.2482 | 0.2206 | 4.4606 | 2.3006 |
| Example 18 | 0.15 | 7.0988 | 0.3676 | 4.4606 | 2.3006 |
| Example 19 | 0.24 | 6.8746 | 0.5882 | 4.4606 | 2.3006 |
| Comparative Example 16 | 0.3 | 6.7252 | 0.7353 | 4.4606 | 2.3006 |

Evaluation of $Na_4Co_{(3-x)}Mn_x(PO_4)_2P_2O_7$

Examples 14 to 19, Comparative Example 16

In the same manner as Examples 1 to 8 and Comparative Examples 1 and 2, the cathode and the sodium secondary the value shown in Table 8 (Example 20 and 21: x=0.03, 0.06, Comparative Example 17: x=0.09). Table 8 also shows the composition of Comparative Example 1. It was also confirmed that the cathode active materials obtained in Examples 20 and 21 and Comparative Example 17 have a crystal structure belonging to space group $Pn2_1a$.

TABLE 8

$Na_4Co_{(3-x)}Al_x(PO_4)_2P_2O_7$

| | x | Amounts (mg) | | | |
|---|---|---|---|---|---|
| | | $(CH_3COO)_2Co•4H_2O$ | $Al(NO_3)_3•9H_2O$ | $Na_4P_2O_7•10H_2O$ | $NH_4H_2PO_4$ |
| Comparative Example 1 | 0 | 7.4724 | 0 | 4.4606 | 2.3006 |
| Example 20 | 0.03 | 7.3977 | 0.1125 | 4.4606 | 2.3006 |
| Example 21 | 0.06 | 7.323 | 0.2251 | 4.4606 | 2.3006 |
| Comparative Example 17 | 0.09 | 7.2462 | 0.3376 | 4.4606 | 2.3006 |

Evaluation of $Na_4Co_{(3-x)}Al_x(PO_4)_2P_2O_7$

Examples 20 and 21, Comparative Example 17

Figure 12:
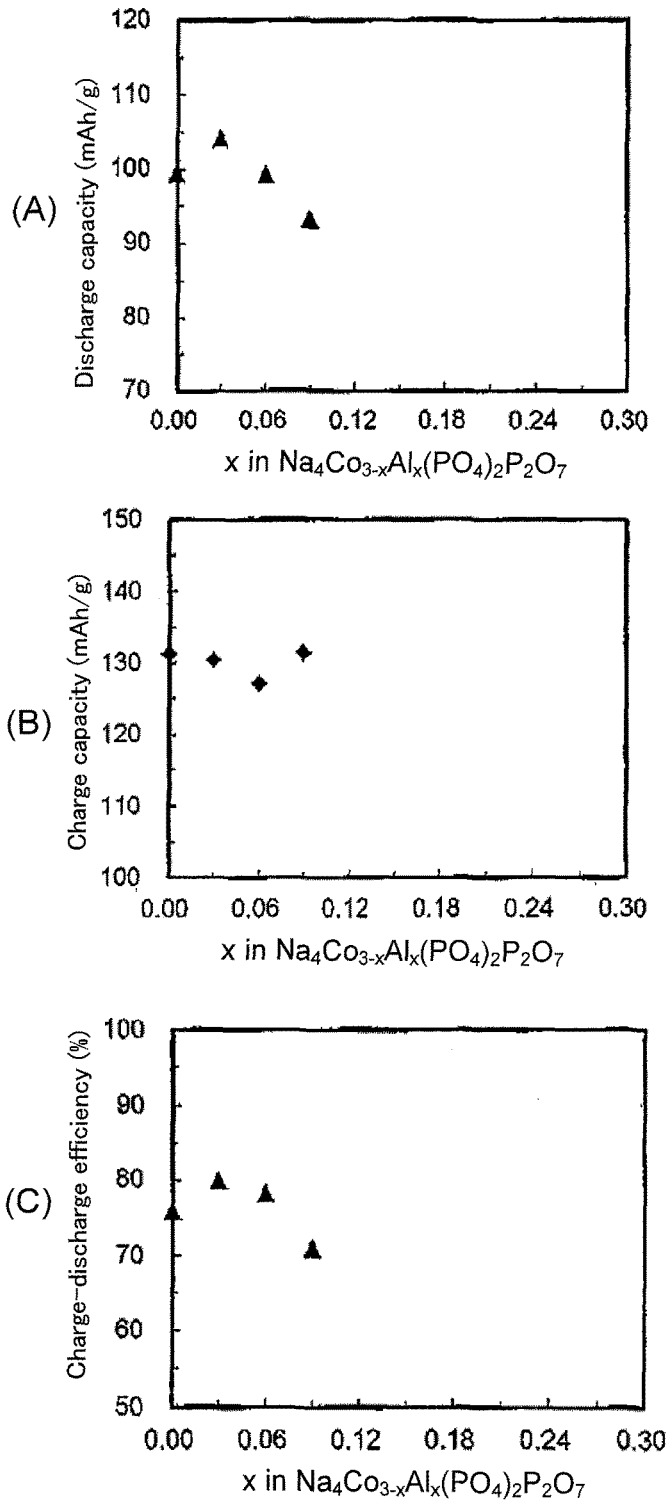
FIG. 12 shows a graph of discharge capacities of secondary batteries containing cathode active materials of Examples 20 and 21 and Comparative Examples 1 and 17.

In the same manner as Examples 1 to 8 and Comparative Examples 1 and 2, the cathode and the sodium secondary battery were produced, and the charge-discharge test was carried out thereon. The discharge capacity, charge capacity and charge-discharge efficiency of the first cycle are shown in (A), (B) and (C) in FIG. 12. In FIG. 12, the horizontal axis is x in $Na_4Co_{(3-x)}Al_x(PO_4)_2P_2O_7$. FIG. 12 also shows the results of Comparative Example 1.

As shown in FIG. 12, Examples 20 and 21 (in which x in $Na_4Co_{(3-x)}Al_x(PO_4)_2P_2O_7$ is in a range of 0.03≤x≤0.06) had higher discharge capacities than Comparative Example 1 (x=0). Also, Example 20 and 21 showed higher charge-discharge efficiencies than Comparative Example 1.

On the other hand, Comparative Example 17 (in which x in $Na_4Co_{(3-x)}Al_x(PO_4)_2P_2O_7$ is 0.09) showed a lower discharge capacity than Comparative Example 1.

Synthesis of $Na_4Co_{(3-x)}Ni_x(PO_4)_2P_2O_7$

Comparative Examples 18 to 20

Cathode active materials ($Na_4Co_{(3-x)}Ni_x(PO_4)_2P_2O_7$) were obtained in the same manner as Examples 1 to 8, except that $(CH_3COO)_2Co.4H_2O$, $(CH_3COO)_2Ni.4H_2O$, $Na_4P_2O_7.10H_2O$ and $NH_4H_2PO_4$ in the amounts (mg) shown in Table 9 below were used as starting materials.

The thus-obtained cathode active materials of Comparative Examples 18 to 20 were analyzed by XRD. For each cathode active material, it was confirmed that x in $Na_4Co_{(3-x)}Ni_x(PO_4)_2P_2O_7$ has the composition of the value shown in Table 9 (x=0.03, 0.09, 0.15). Table 9 also shows the composition of Comparative Example 1. It was also confirmed that the cathode active materials obtained in Comparative Examples 18 to 20 have a crystal structure belonging to space group $Pn2_1a$.

TABLE 9

$Na_4Co_{(3-x)}Ni_x(PO_4)_2P_2O_7$

| | x | Amounts (mg) | | | |
|---|---|---|---|---|---|
| | | $(CH_3COO)_2Co•4H_2O$ | $(CH_3COO)_2Ni•4H_2O$ | $Na_4P_2O_7•10H_2O$ | $NH_4H_2PO_4$ |
| Comparative Example 1 | 0 | 7.4724 | 0 | 4.4606 | 2.3006 |
| Comparative Example 18 | 0.03 | 7.3977 | 0.0747 | 4.4606 | 2.3006 |
| Comparative Example 19 | 0.09 | 7.2482 | 0.224 | 4.4606 | 2.3006 |
| Comparative Example 20 | 0.15 | 7.0988 | 0.3733 | 4.4606 | 2.3006 |

Evaluation of $Na_4Co_{(3-x)}Ni_x(PO_4)_2P_2O_7$

Comparative Examples 18 to 20

In the same manner as Examples 1 to 8 and Comparative Examples 1 and 2, the cathode and the sodium secondary battery were produced, and the charge-discharge test was carried out thereon. The discharge capacity, charge capacity and charge-discharge efficiency of the first cycle are shown in (A), (B) and (C) in FIG. 13. In FIG. 13, the horizontal axis is x in $Na_4Co_{(3-x)}Ni_x(PO_4)_2P_2O_7$. FIG. 13 also shows the results of Comparative Example 1.

As shown in FIG. 13, Comparative Examples 18 to 20 (in which x in $Na_4Co_{(3-x)}Ni_x(PO_4)_2P_2O_7$ is larger than 0 (0.03≤x≤0.15)) had lower discharge capacities than Comparative Example 1 (x=0), and their discharge capacities showed a tendency to decrease as x increased.

Synthesis of $Na_4Co_{(3-x)}Zr_x(PO_4)_2P_2O_7$

Comparative Examples 21 to 23

Cathode active materials ($Na_4Co_{(3-x)}Zr_x(PO_4)_2P_2O_7$) were obtained in the same manner as Examples 1 to 8, except that $(CH_3COO)_2Co.4H_2O$, $ZrO(NO_3)_3.2H_2O$, $Na_4P_2O_7.10H_2O$ and $NH_4H_2PO_4$ in the amounts (mg) shown in Table 10 below were used as starting materials.

The thus-obtained cathode active materials of Comparative Examples 21 to 23 were analyzed by XRD. For each cathode active material, it was confirmed that x in $Na_4Co_{(3-x)}Zr_x(PO_4)_2P_2O_7$ has the composition of the value shown in Table 10 (x=0.03, 0.09, 0.15). Table 10 also shows the composition of Comparative Example 1. It was also confirmed that the cathode active materials obtained in Comparative Examples 21 to 23 have a crystal structure belonging to space group $Pn2_1a$.

TABLE 10

| | | $Na_4Co_{(3-x)}Zr_x(PO_4)_2P_2O_7$ | | | |
| --- | --- | --- | --- | --- | --- |
| | | Amounts (mg) | | | |
| | x | $(CH_3COO)_2Co \cdot 4H_2O$ | $ZrO(NO_3)_3 \cdot 2H_2O$ | $Na_4P_2O_7 \cdot 10H_2O$ | $NH_4H_2PO_4$ |
| Comparative Example 1 | 0 | 7.4724 | 0 | 4.4606 | 2.3006 |
| Comparative Example 21 | 0.03 | 7.3977 | 0.0401 | 4.4606 | 2.3006 |
| Comparative Example 22 | 0.09 | 7.2482 | 0.1203 | 4.4606 | 2.3006 |
| Comparative Example 23 | 0.15 | 7.0988 | 0.2004 | 4.4606 | 2.3006 |

Evaluation of $Na_4Co_{(3-x)}Zr_x(PO_4)_2P_2O_7$

Comparative Examples 21 to 23

In the same manner as Examples 1 to 8 and Comparative Examples 1 and 2, the cathode and the sodium secondary battery were produced, and the charge-discharge test was carried out thereon. The discharge capacity, charge capacity and charge-discharge efficiency of the first cycle are shown in (A), (B) and (C) in FIG. 14. In FIG. 14, the horizontal axis is x in $Na_4Co_{(3-x)}Zr_x(PO_4)_2P_2O_7$. FIG. 14 also shows the results of Comparative Example 1.

As shown in FIG. 14, Comparative Examples 21 to 23 (in which x in $Na_4Co_{(3-x)}Zr_x(PO_4)_2P_2O_7$ is larger than 0 (0.03≤x≤0.15)) had lower discharge capacities than Comparative Example 1 (x=0), and their discharge capacities showed a tendency to decrease as x increased. The charge-discharge efficiencies of Comparative Examples 21 to 23 were also lower than Comparative Example 1.

REFERENCE SIGNS LIST

1. Anode
2. Cathode
3. Electrolyte layer
4. Anode active material layer
5. Anode current collector
6. Cathode active material layer
7. Cathode current collector
8. Sodium secondary battery

The invention claimed is:

1. A cathode active material for sodium batteries, wherein the cathode active material is represented by a general formula $Na_4Co_{(3-x)}M_x(PO_4)_2P_2O_7$; M is any of Fe, Cr, Mn and Al; X is 0.015≤x≤0.21 when M is Fe; X is 0.03≤x≤0.18 when M is Cr; X is 0.006≤x≤0.24 when M is Mn; and X is 0.03≤x≤0.06 when M is Al.

2. The cathode active material for sodium batteries according to claim 1, wherein the cathode active material is represented by a general formula $Na_4Co_{(3-x)}Fe_x(PO_4)_2P_2O_7$ (0.015≤x≤0.21).

3. The cathode active material for sodium batteries according to claim 1, wherein the cathode active material is represented by a general formula $Na_4Co_{(3-x)}Cr_x(PO_4)_2P_2O_7$ (0.03≤x≤0.18).

4. The cathode active material for sodium batteries according to claim 1, wherein the cathode active material is represented by a general formula $Na_4Co_{(3-x)}Mn_x(PO_4)_2P_2O_7$ (0.006≤x≤0.24).

5. The cathode active material for sodium batteries according to claim 1, wherein the cathode active material is represented by a general formula $Na_4Co_{(3-x)}Al_x(PO_4)_2P_2O_7$ (0.03≤x≤0.06).

6. The cathode active materials for sodium batteries according to claim 1, wherein the cathode active materials have a crystal structure belonging to space group $Pn2_1a$.

7. A sodium battery, wherein the sodium battery comprises a cathode containing the cathode active material for sodium batteries defined by claim 1.

* * * * *